US012676767B2

(12) United States Patent
Ryan et al.

(10) Patent No.: US 12,676,767 B2
(45) Date of Patent: Jul. 7, 2026

(54) AUTOMATION FOR INSERTING A REFERENCE ACCESSING A SCREEN-SHARED FILE IN MEETING SUMMARIES AND TRANSCRIPTS

(71) Applicant: Microsoft Technology Licensing, LLC, Redmond, WA (US)

(72) Inventors: Emma Ryan, Seattle, WA (US); Sachin Katyal, Redmond, WA (US); Jatin Patel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/680,071

(22) Filed: May 31, 2024

(65) Prior Publication Data

US 2025/0373461 A1     Dec. 4, 2025

(51) Int. Cl.
H04L 12/18 (2006.01)
G06F 3/14 (2006.01)
(52) U.S. Cl.
CPC ........ H04L 12/1831 (2013.01); G06F 3/1454 (2013.01)
(58) Field of Classification Search
None
See application file for complete search history.

(56) References Cited

U.S. PATENT DOCUMENTS

| | | | |
|---|---|---|---|
| 10,110,645 B2 | 10/2018 | Bader-Natal | |
| 10,574,827 B1 | 2/2020 | Pettay | |
| 11,317,060 B1 | 4/2022 | Libin | |
| 11,720,244 B2 | 8/2023 | Rongrong et al. | |
| 12,099,770 B1 * | 9/2024 | Bakshi | H04L 67/306 |
| 2003/0105820 A1 * | 6/2003 | Haims | G06Q 10/10 709/227 |
| 2017/0083214 A1 * | 3/2017 | Furesjö | G06Q 10/10 |
| 2018/0295334 A1 * | 10/2018 | Furesjö | G11B 27/34 |
| 2019/0273767 A1 * | 9/2019 | Nelson | H04M 7/0027 |
| 2019/0288968 A1 * | 9/2019 | Chilakamarri | H04L 65/403 |

(Continued)

FOREIGN PATENT DOCUMENTS

WO     WO-2024118197 A1 *  6/2024  ........... G06Q 10/063

OTHER PUBLICATIONS

International Search Report and Written Opinion received for PCT Application No. PCT/US2025/019275, May 13, 2025, 12 pages.

(Continued)

*Primary Examiner* — Phyllis A Book
(74) *Attorney, Agent, or Firm* — Scott Y. Shigeta; Newport IP, LLC

(57) ABSTRACT

The disclosed techniques provide a system for automatically inserting reference to a file in meeting transcripts or meeting summaries. In general, the disclosed techniques manage and enrich meeting transcripts, meeting summaries, meeting recordings, and screen-shared files during an online meeting. During an online meeting, when a presenter screenshares an application file, such as Word doc, PowerPoint, Excel, etc., a system creates meeting transcripts or a summary for the real-time discussion based on audio signals and/or chat messages relating to the shared contents of the application file. The system also determines the location of the application file and inserts a reference to the application file in the transcript or summary.

20 Claims, 35 Drawing Sheets

(56) References Cited

U.S. PATENT DOCUMENTS

| | | | | |
|---|---|---|---|---|
| 2020/0374146 A1* | 11/2020 | Chhabra | ............ | H04L 12/1822 |
| 2021/0110154 A1 | 4/2021 | Beller | | |
| 2021/0133681 A1 | 5/2021 | Dhaliwal | | |
| 2021/0264929 A1 | 8/2021 | Osebe | | |
| 2021/0320953 A1* | 10/2021 | Sexauer | .............. | H04L 65/1069 |
| 2021/0367802 A1 | 11/2021 | Yarlagadda | | |
| 2022/0107816 A1* | 4/2022 | Chhabra | .............. | G06F 9/4451 |
| 2022/0180869 A1 | 6/2022 | Rahmel | | |
| 2022/0263877 A1 | 8/2022 | Conlin | | |
| 2022/0303322 A1* | 9/2022 | Rangarajan | ......... | H04L 65/4025 |
| 2022/0342524 A1* | 10/2022 | Rongrong | ............ | G06F 3/0486 |
| 2022/0414321 A1 | 12/2022 | Chan | | |
| 2023/0052258 A1* | 2/2023 | Akhoury | ............ | G06F 16/9035 |
| 2023/0055241 A1 | 2/2023 | Zionpour | | |
| 2023/0101672 A1* | 3/2023 | LaFave | ............... | G06F 3/04842 |
| | | | | 715/753 |
| 2023/0155851 A1* | 5/2023 | Cupala | ............... | H04L 12/1818 |
| | | | | 709/204 |
| 2023/0156053 A1* | 5/2023 | Malan | ................... | G06F 3/0486 |
| | | | | 709/204 |
| 2023/0247068 A1* | 8/2023 | Weiss | ................. | H04L 65/4025 |
| | | | | 709/204 |
| 2024/0154927 A1* | 5/2024 | McNeill | ............... | H04L 51/214 |
| 2024/0214439 A1* | 6/2024 | Boht | ..................... | H04L 65/613 |
| 2024/0314094 A1* | 9/2024 | Bergenlid | .............. | G06F 16/44 |
| 2024/0427546 A1* | 12/2024 | Shruti | ................... | G06F 3/1454 |
| 2025/0119461 A1 | 4/2025 | Magnus | | |
| 2025/0193259 A1 | 6/2025 | Dasher | | |

OTHER PUBLICATIONS

International Search Report and Written Opinion received for PCT Application No. PCT/US2025/019274, May 23, 2025, 12 pages.

"Get notified when members of your team update your shared file", accessed on link https://support.microsoft.com/en-gb/office/get-notified-when-members-of-your-team-update-your-shared-file-9cc94893-02d5-4d96-9b3f-8b9414d5047a, Jun. 4, 2023, 2 pages.

"Meeting recap in Microsoft Teams", accessed on link https://support.microsoft.com/en-GB/office/meeting-recap-in-microsoft-teams-c2e3a0fe-504f-4b2c-bf85-504938f110ef#bkmk_intelligent_meeting_recap, 2024, 11 pages.

"Uploading transcripts", accessed on link https://help.relativity.com/RelativityOne/Content/Relativity/Transcripts_application/Uploading transcripts, Dec. 5, 2023, 6 pages.

"Using screen reader alerts" Zoom Support, retrieved from https://support.zoom.com/hc/en/article?id=zm_kb&sysparm_article=KB0066934, Mar. 27, 2024, 4 pages.

Arora, Vaishali., "How Artificial Intelligence is Transforming Video Conferencing?", OneClick, retrieved from https://www.oneclickitsolution.com/blog/next-gen-video-conferencing-using-artificial-intelligence-ai/, Jan. 4, 2024, 6 pages.

Bastie, Andre., "Create Emails from Transcripts with Happy Scribe's AI Assist", accessed on link https://www.happyscribe.com/blog/en/create-emails-from-transcripts-with-happy-scribe-ai-assist, Jun. 2020, 16 pages.

Non-Final Office Action mailed on Sep. 8, 2025, in U.S. Appl. No. 18/680,169, 11 Pages.

Notice of Allowance mailed on Jan. 21, 2026, in U.S. Appl. No. 18/680,169, 6 pages.

* cited by examiner

SECOND COMPUTER 11B: SELECTION OF LINK OPENS THE FILE FOR THE SECOND USER 10B

APPLICATION
UI 141

Word Processing Application

HOME  INSERT  DATA

Aptos (Body)  B  I  U

Economics is a social science concerned chiefly with description and analysis of the production, distribution, and consumption of goods and services.

Economics focuses on the behavior and interactions of economic agents and how economies work. Microeconomics analyzes basic elements in the economy, including individual agents and markets, their interactions, and the outcomes of interactions.

Individual agents may include, for example, households, firms, buyers, and sellers. A household can include an individual or a group of individuals. A firm can include a company, public or private.

MAIN CONTENT REGION 145

Miguel
I like this first paragraph.

Serena
We might want to add a spreadsheet to this file

COMMENT REGION 146

X

100

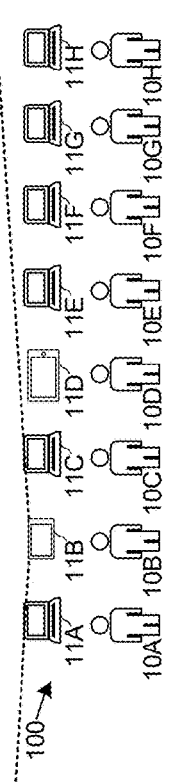

SCENARIO 1: FILE STORED ON THE CLIENT DEVICE
DETERMINING THE LOCATION OF THE FILE: SYSTEM QUERIES PRODUCTIVITY APPLICATION FOR FILE PATH IN RESPONSE TO SCREEN SHARE DISPLAYING A FILE (E.G., DOC, PPT, XLS, ETC.)
AND/OR DETECTION OF SELECT CONTENT IN COMMUNICATION

SCENARIO 1: FILE STORED ON THE CLIENT DEVICE
DETERMINING THE LOCATION OF THE FILE: IF FILE PATH INDICATES THAT THE FILE IS STORED ON THE CLIENT, THE FILE IS COPIED TO THE SERVER STORAGE

SCENARIO 1: FILE STORED ON THE CLIENT DEVICE
DETERMINING THE LOCATION OF THE FILE: A LINK TO THE FILE IS GENERATED AND PERMISSIONS ARE SET FOR PERMITTING MEETING ATTENDEES TO VIEW AND EDIT THE FILE, THE LINK IS THEN INSERTED INTO THE TRANSCRIPT OR MEETING SUMMARY
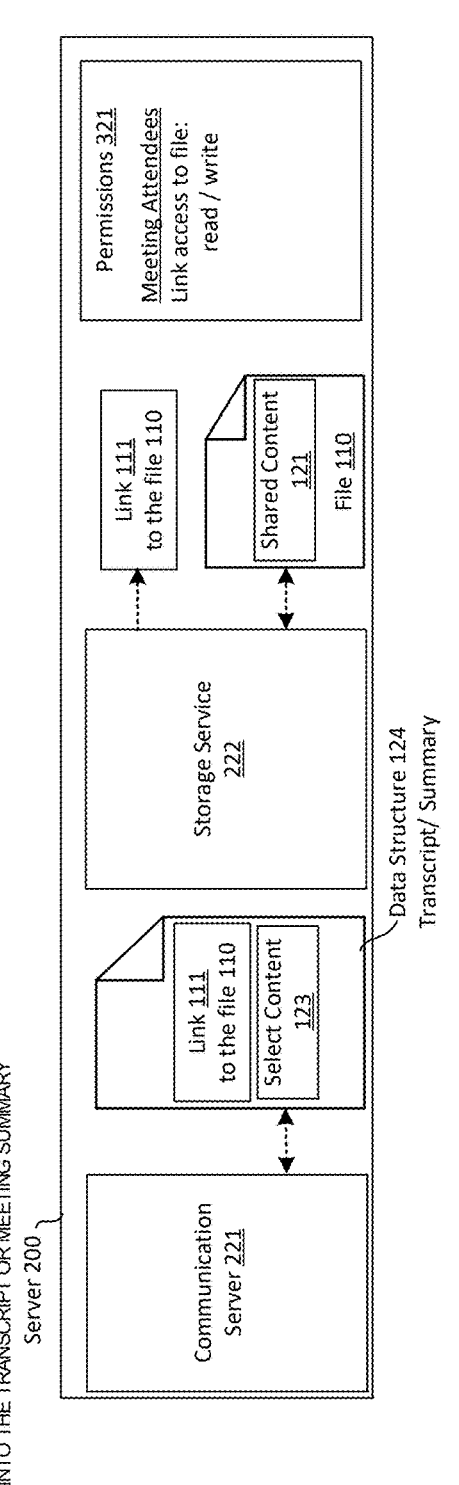
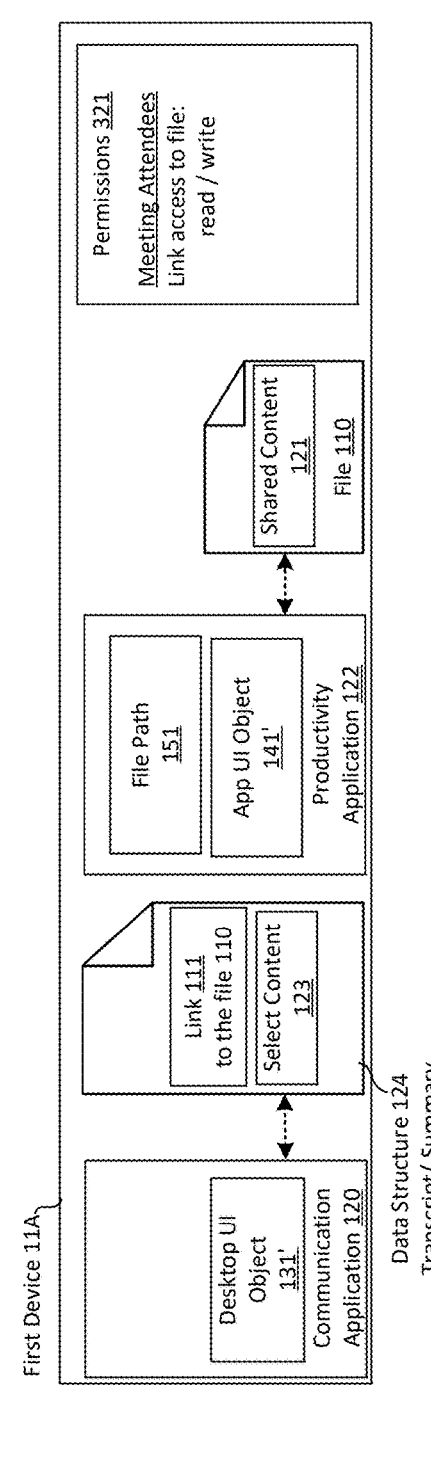
*FIG. 4C*

SCENARIO 2: FILE STORED ON THE SERVER
DETERMINING THE LOCATION OF THE FILE: SYSTEM QUERIES PRODUCTIVITY APPLICATION FOR THE FILE PATH IN RESPONSE TO A SCREEN SHARE DISPLAYING A FILE AND/OR DETECTION OF SELECT CONTENT IN COMMUNICATION

SCENARIO 2: FILE STORED ON THE SERVER
DETERMINING THE LOCATION OF THE FILE; IF FILE PATH INDICATES THAT THE FILE IS STORED ON THE SERVER, THE SERVER GENERATES A LINK TO THE FILE. PERMISSIONS ARE SET FOR PERMITTING MEETING ATTENDEES TO VIEW AND EDIT THE FILE, THE LINK IS THEN INSERTED INTO THE TRANSCRIPT OR MEETING SUMMARY

Figure 7A:
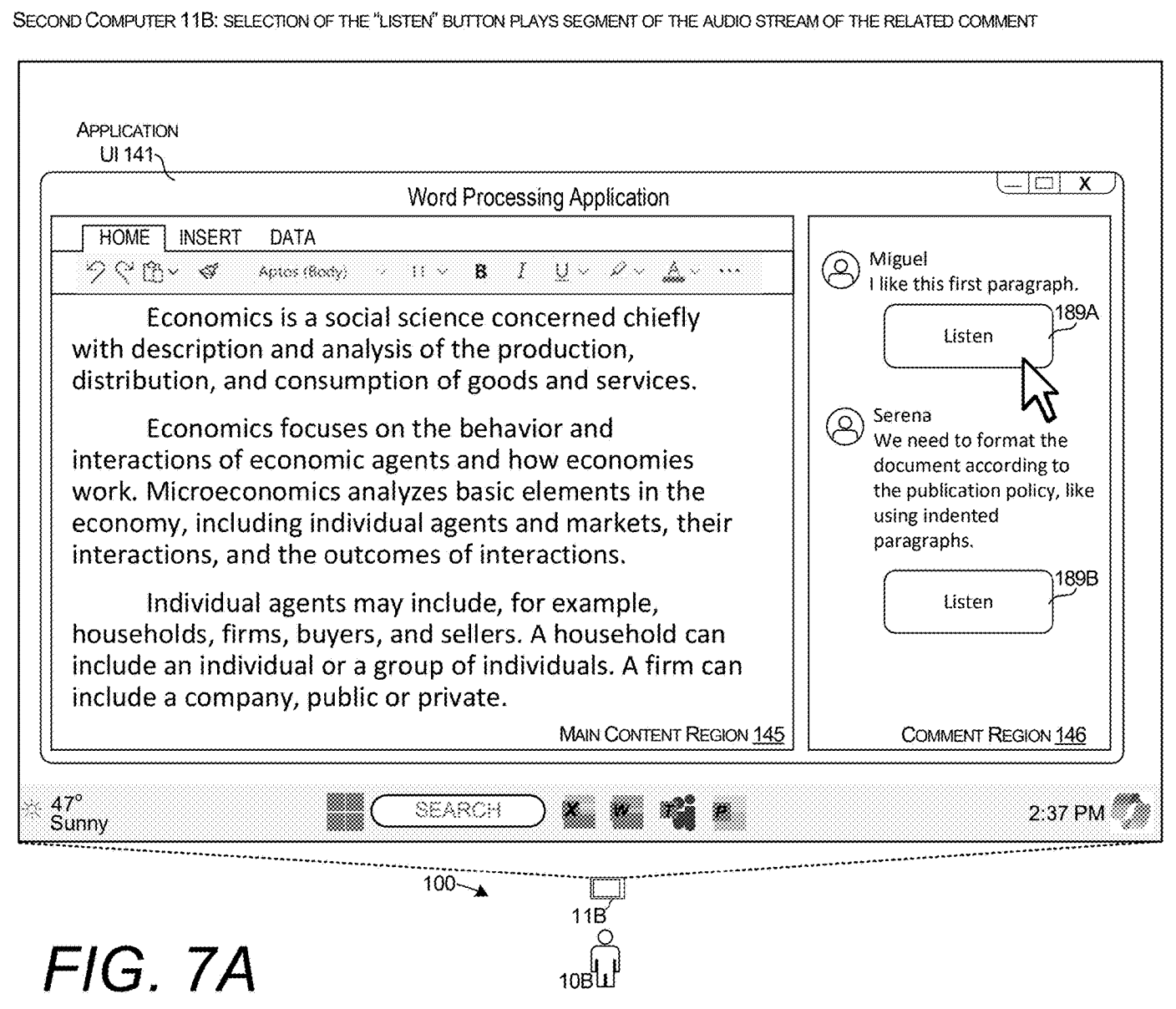

SECOND COMPUTER 11B: SELECTION OF THE "LISTEN" BUTTON PLAYS SEGMENT OF THE AUDIO STREAM OF THE RELATED COMMENT

APPLICATION
UI 141

Word Processing Application

HOME    INSERT    DATA

4ptos (Body)    B    I    U    ⌄    ⌀    A    ⌄    •••

Economics is a social science concerned chiefly with description and analysis of the production, distribution, and consumption of goods and services.

Economics focuses on the behavior and interactions of economic agents and how economies work. Microeconomics analyzes basic elements in the economy, including individual agents and markets, their interactions, and the outcomes of interactions.

Individual agents may include, for example, households, firms, buyers, and sellers. A household can include an individual or a group of individuals. A firm can include a company, public or private.

MAIN CONTENT REGION 145

Miguel
I like this first paragraph.
189A

| Listen |

Serena
We need to format the document according to the publication policy, like using indented paragraphs.
189B

| Listen |

COMMENT REGION 146

47°
Sunny

SEARCH

SCENARIO 1: FILE STORED ON THE CLIENT DEVICE

DETERMINING THE LOCATION OF THE FILE: SYSTEM QUERIES PRODUCTIVITY APPLICATION FOR FILE PATH IN RESPONSE TO SCREEN SHARE DISPLAYING A FILE (E.G., DOC, PPT, XLS, ETC.) AND/OR DETECTION OF SELECT CONTENT IN COMMUNICATION

SCENARIO 1: FILE STORED ON THE CLIENT DEVICE
DETERMINING THE LOCATION OF THE FILE: IF FILE PATH INDICATES THAT THE FILE IS STORED ON THE CLIENT, THE FILE IS COPIED TO THE SERVER STORAGE

SCENARIO 1: FILE STORED ON THE CLIENT DEVICE
DETERMINING THE LOCATION OF THE FILE: THE SELECT CONTENT DETECTED IN THE COMMUNICATION DATA IS INSERTED IN THE FILE FOR SHARING. PERMISSIONS ARE SET FOR PERMITTING MEETING ATTENDEES TO VIEW AND EDIT THE SERVER FILE.
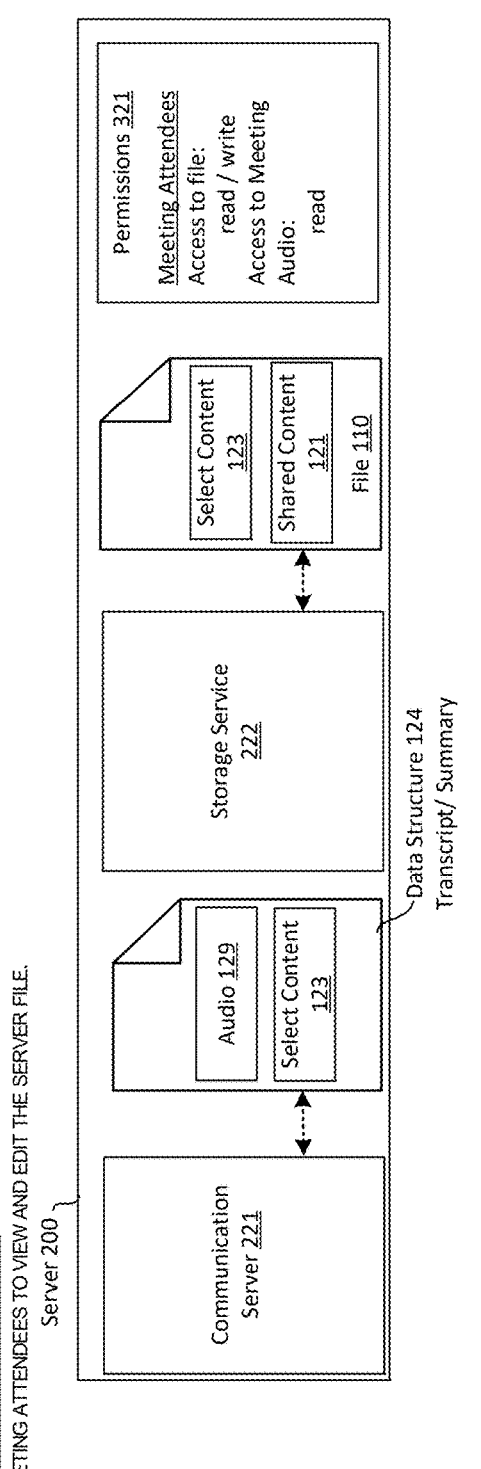
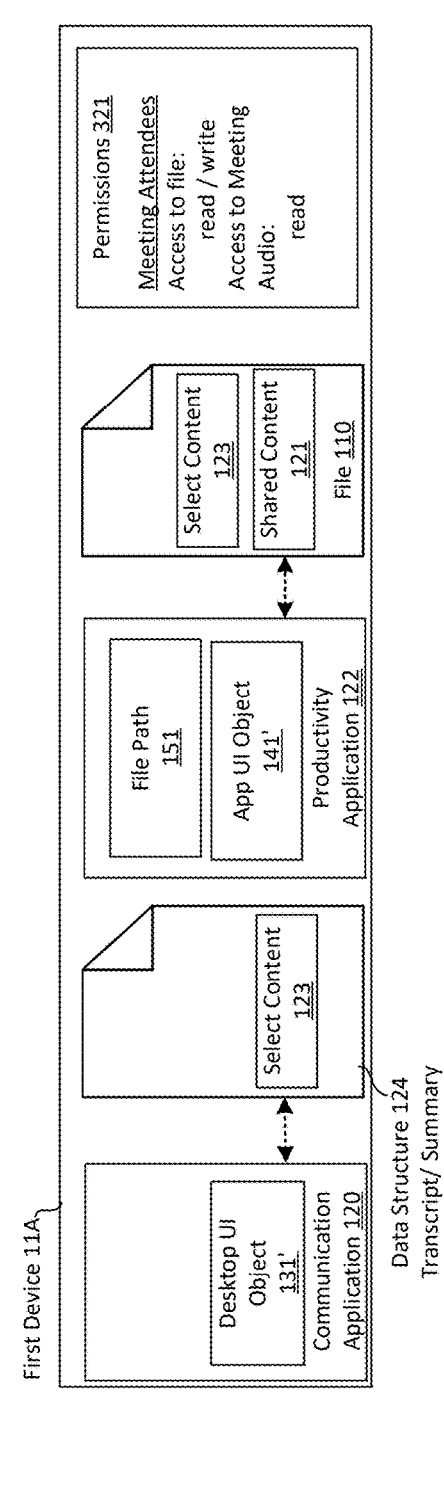
*FIG. 8C*

SCENARIO 2: FILE STORED ON THE SERVER
DETERMINING THE LOCATION OF THE FILE: SYSTEM QUERIES PRODUCTIVITY APPLICATION FOR THE FILE PATH IN RESPONSE TO A SCREEN SHARE DISPLAYING A FILE AND/OR DETECTION
OF SELECT CONTENT IN COMMUNICATION

SCENARIO 2: FILE STORED ON THE SERVER
DETERMINING THE LOCATION OF THE FILE: IF FILE PATH INDICATES THAT THE FILE IS STORED ON THE SERVER, THE SELECT CONTENT DETECTED IN THE COMMUNICATION DATA IS COPIED
TO THE SERVER STORED FILE FOR SHARING. PERMISSIONS ARE SET FOR PERMITTING MEETING ATTENDEES TO VIEW AND EDIT THE SERVER FILE

Figure 12:
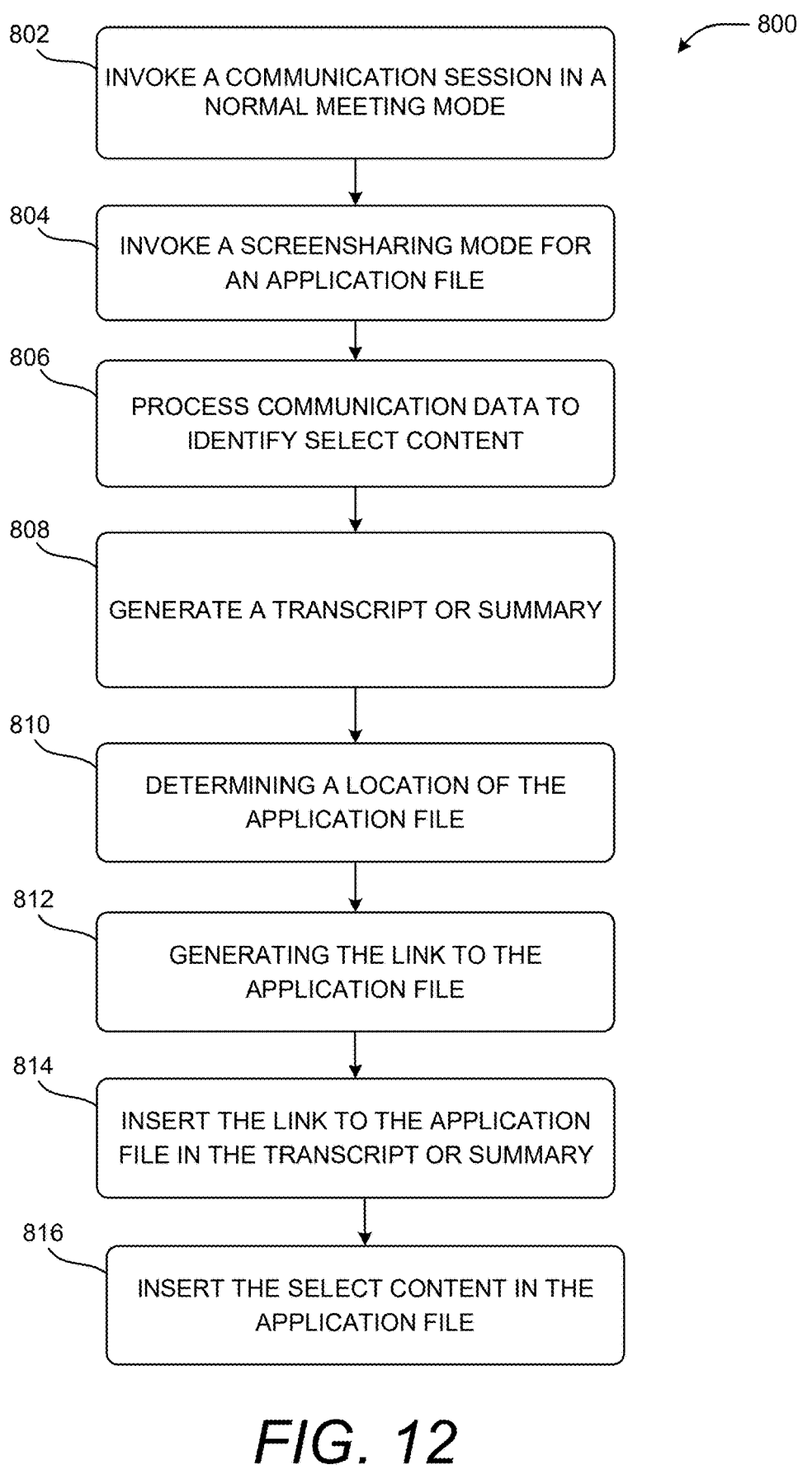

802 — INVOKE A COMMUNICATION SESSION IN A NORMAL MEETING MODE

804 — INVOKE A SCREENSHARING MODE FOR AN APPLICATION FILE

806 — PROCESS COMMUNICATION DATA TO IDENTIFY SELECT CONTENT

808 — GENERATE A TRANSCRIPT OR SUMMARY

810 — DETERMINING A LOCATION OF THE APPLICATION FILE

812 — GENERATING THE LINK TO THE APPLICATION FILE

814 — INSERT THE LINK TO THE APPLICATION FILE IN THE TRANSCRIPT OR SUMMARY

816 — INSERT THE SELECT CONTENT IN THE APPLICATION FILE

AUTOMATION FOR INSERTING A REFERENCE ACCESSING A SCREEN-SHARED FILE IN MEETING SUMMARIES AND TRANSCRIPTS

BACKGROUND

There are a number of different types of collaborative systems that allow users to communicate. For example, some systems allow people to collaborate by sharing content using video and audio streams, shared files, chat messages, etc. Some systems manage communication sessions, which are also referred to herein as online meetings, virtual reality sessions, broadcasts, etc. Such sessions can include events that have a distinct start time and an end time that occur on specific dates. People can schedule these sessions on a calendar and have a number of events scheduled throughout the day. Users can schedule meetings in advance, invite other participants, and use various content sharing features such as audio, video, chat, screen sharing, whiteboards, etc.

Although some existing systems provide a number of features that allow people to collaborate during specific events, such systems have a number of drawbacks. For example, when users share content using different productivity applications (also referred to herein as an "application"), such as word processing applications, spreadsheet applications, or presentation applications, these applications generally operate independent from the communication program managing the shared video streams and audio streams. Thus, during a meeting, when users share a view of their desktop to share content of a specific document, the person sharing the document is required to manually provide edits to the document while also paying attention to a discussion about the document. The user may have to switch back and forth between the communication application and the document application to carry out all tasks. This is due to the fact that such productivity applications, such as WORD, EXCEL, or POWERPOINT, operate independently from the communication application that manages the meeting, such as MICROSOFT TEAMS, GOOGLE MEET, etc. During a meeting, a person may have to switch from a communication application to view a text message to a productivity application to edit a document. This can involve minimizing the window of the communication program, selecting the productivity application their primary window, then providing inputs for editing the document. This can be distracting to the user making the edits and cause them to miss shared content and important information shared during the meeting.

The above-described technical issues can also cause additional problems if a document is stored on a server or cloud service. If a user wishes to share a document with other of a meeting, that user has to upload the document to a storage service, configure the permissions to allow others to edit the document, then provide additional inputs to share that document via a screenshare session. Such tasks add distractions to the flow of meetings while still requiring users to manually edit the shared document and engage with the communication of other participants. These situations often lead to reduced productivity and inefficient use of computing resources, underscoring the need for more efficient solutions and user interface arrangements.

SUMMARY

The disclosed techniques provide a system for automatically inserting links to a file in meeting transcripts or meeting summaries. In general, the disclosed techniques manage and enrich meeting transcripts, meeting summaries, meeting recordings, and screen-shared files during an online meeting. During an online meeting, when a presenter screen-shares an application file, such as a Word doc, PowerPoint file, Excel spreadsheet, etc., a system creates meeting transcripts or a meeting summary from a real-time discussion based on audio signals and/or chat messages that are shared while the application file is shared in screen sharing mode. The system determines the location of the application file and inserts a link to the application file in the transcript or summary. The system can perform these operations for an application file that resides locally on the presenter's machine or in a remote storage service, such as OneDrive, Google Drive, etc.

The system can also automatically control permissions for accessing and modifying the application file and the transcript or summary. For instance, a person sharing a document in a screen sharing session may start a meeting being the only person with permission settings to access and modify the file. However, during the screen sharing session, when meeting transcripts or meeting summaries are generated, the system can insert a link to the file that is being shared in screen sharing mode in the transcripts or the meeting summary. In addition, the system updates the file permission settings to allow other members of the meeting to access and modify the file. If the file is stored locally on the presenter's local device, a copy of the file is made to a storage server allowing all members of a meeting to access the file. Permissions to the meeting communication data, such as voice audio communication and message communication, are also configured to allow each member of the meeting to access the meeting communication data using the link in the file.

The technical challenge of concurrently accessing a shared file and meeting summaries or meeting transcripts is solved by the technical solution of a system that inserts links to a screen-shared file within meeting transcripts and meeting summaries. The system provides improved user interaction by providing access to information that is normally difficult to view since meeting data and file contents are traditionally controlled by different applications. Permissions are also set automatically so users do not have to interrupt a meeting to set access permissions. Thus, in addition to improving the security of a system, the techniques disclosed herein can provide a number of other computing resource efficiencies. By providing automated link insertion features in meeting content, participants can track conversations of a meeting and spend less time controlling permissions and views of shared content, allowing users to focus on salient points with minimal interruptions.

When information and permission transitions are organized more accurately and with fewer manual inputs, audience members are less likely to miss salient information during an event and this automation of more granular control of permissions also eliminates the element of human error when it comes to manually setting permissions. Such benefits can increase the efficiency and security of a computing system by reducing the number of times a user needs to interact with a computing device to obtain information or restrict access to information. For example, if users in a meeting miss shared content because of inefficient human interactions, they have to resort to prolonged meetings, extensive use of meeting recordings, or require duplicate copies of previously shared content that may require email systems, etc. Thus, various computing resources such as network resources, memory resources, and processing resources can be reduced by mitigating scenarios where content is missed or inadvertently restricted.

As described above, the claimed features lead to the reduction of manual data entry that needs to be performed by a user. By reducing the need for manual entry, inadvertent inputs and human error can be reduced. This can ultimately lead to a reduction in undesirable permission settings, which can leave attack vectors in a shared content, and more efficient use of computing resources such as memory usage, network usage, processing resources, etc.

The techniques disclosed herein also provide improved access to meeting summaries and meeting transcripts. By automatically inserting links to a file in meeting summaries and meeting transcripts, the disclosed system presents access to information to users that allows better and more efficient interactions for computers in general and especially for users with small-screen devices. The disclosed features are particularly helpful in small-screen devices and other devices in that the users do not have to switch between programs and communication programs to access meeting content and productivity file content.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying FIGUREs. In the FIGUREs, the left-most digit(s) of a reference number identifies the FIG. 1*n* which the reference number first appears. The same reference numbers in different FIGUREs indicate similar or identical items. References made to individual items of a plurality of items can use a reference number with a letter of a sequence of letters to refer to each individual item. Generic references to the items may use the specific reference number without the sequence of letters.

FIG. 2B illustrates a user interface displayed on a second computer in regular operating mode, the second computer displaying a file in response to a selection of a link to the file in a meeting transcript or meeting summary.

FIG. 4C illustrates a block diagram of a system for identifying a location of a file that is stored on a client device, the system performing operations for generating a link to the file for inclusion in a transcript or summary.

FIG. 7A illustrates a user interface displayed on a second computer showing content from meeting communication data that is inserted in a file and a link to an audio segment of the meeting that includes the content.

FIG. 8C illustrates a block diagram of a system for identifying a location of a file that is stored on a client device, the system performing operations for inserting content from meeting communication data in the file that is copied or moved to the server.

FIG. 12 is a flow diagram showing aspects of a routine for performing the techniques disclosed herein.

DETAILED DESCRIPTION

Figure 1A:
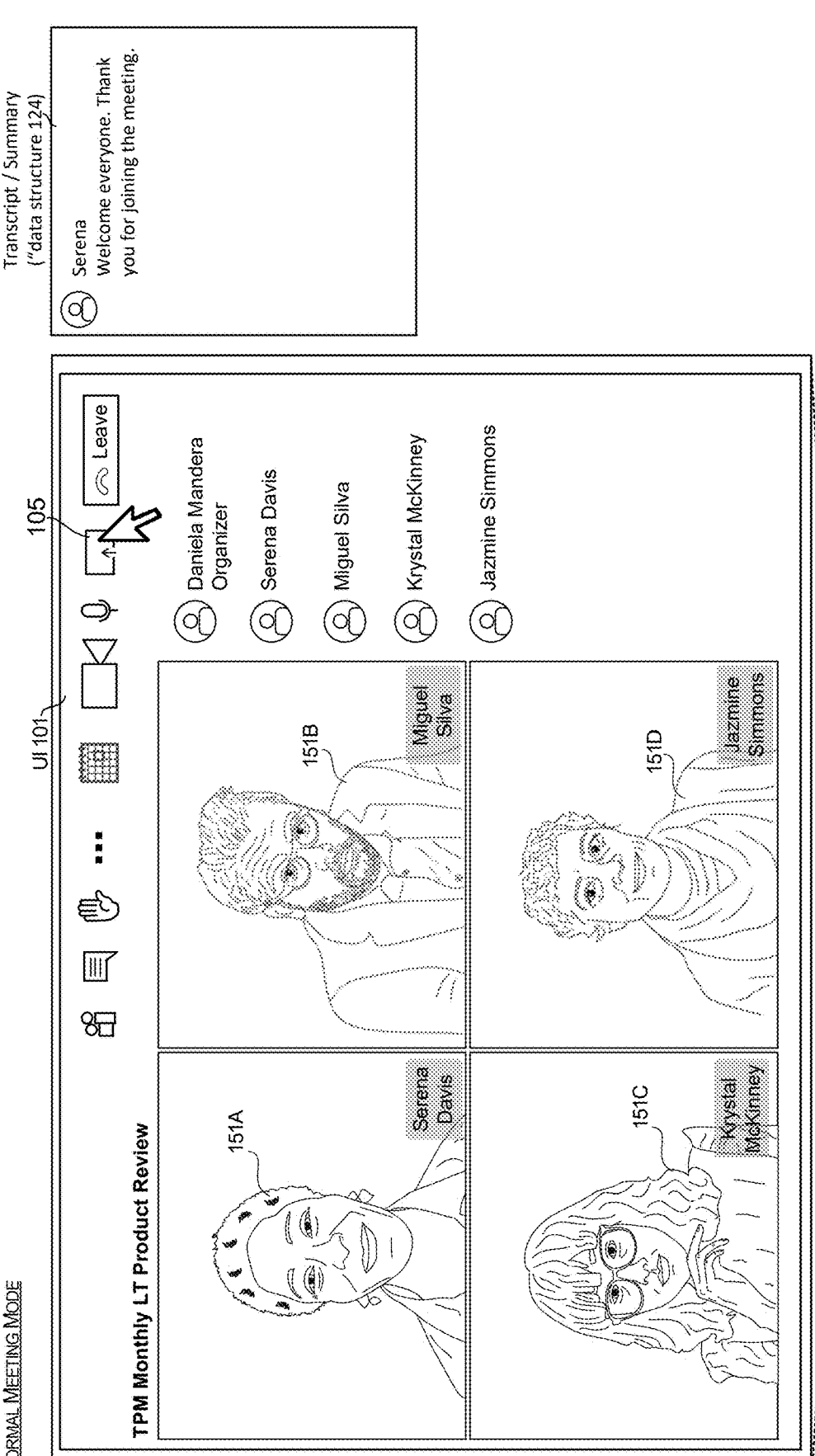
FIG. 1A illustrates a first phase of a process for inserting a link to a file in a transcript, this phase showing a user interface displayed on a first computer of a system in normal meeting mode.

FIGS. 1A-1F illustrate a system 100 for automatically inserting links in meeting transcripts and meeting summaries to an application file. As shown in FIG. 1A, the system 100 includes a number of computing devices 11 each associated with a user 10. The computers are each interconnected using a communication session for sharing video signals, audio signals, and other shared content such as documents. In this example, there are a number of users (10A-10H) in a meeting, where User A 10A, Serena Davis, is associated with a first computing device 11A, User B 10B, Miguel Silva, is associated with a second computing device 11B, User C 10C, Krystal Mckinney, is associated with a third computing device 11C, User D 10D, Jazmine Simmons, is associated with a fourth computing device 11D, User E, Mahendra Sekaran, is associated with a fifth computing device 11E, User F 10F, Michael Wong, is associated with a sixth computing device 11F, User G 10G, Will Newman, is associated with a seventh computing device 11G, User H 10H, Cassie Price, is associated with an eighth computing device 11H. The device of each user is configured to participate in a communication session, e.g., a meeting, at times configured according to a calendar. As described in more detail below, the system 100 can also include a server for managing the meeting using a communication application and a storage service.

FIGS. 1A-1F also illustrate a process for automatically inserting links in meeting transcripts and meeting summaries for accessing an application file. In this example, during an online meeting, a presenter, such as User A using the first device 11A, starts a screenshare an application file such as Word doc, PowerPoint, Excel, etc. The file resides locally on the presenter's machine or at a server, such as a OneDrive server. The system then creates meeting transcripts or summary for the real-time discussion based on audio signals and/or chat messages relating to the shared contents, e.g., the shared file. The server also determines the location of the application file; and then inserts a link in the transcript/summary to the application file. As described in more detail below, the method shown in the following figures includes operations for generating links for accessing an application file displayed in a screen sharing mode during a meeting, and operations for inserting the links in a meeting summary or a meeting transcript. Participants viewing the meeting transcript or meeting summary can then access the application file that was screen shared during their meeting by selecting the links in the meeting transcript or meeting summary.

Figure 1B:
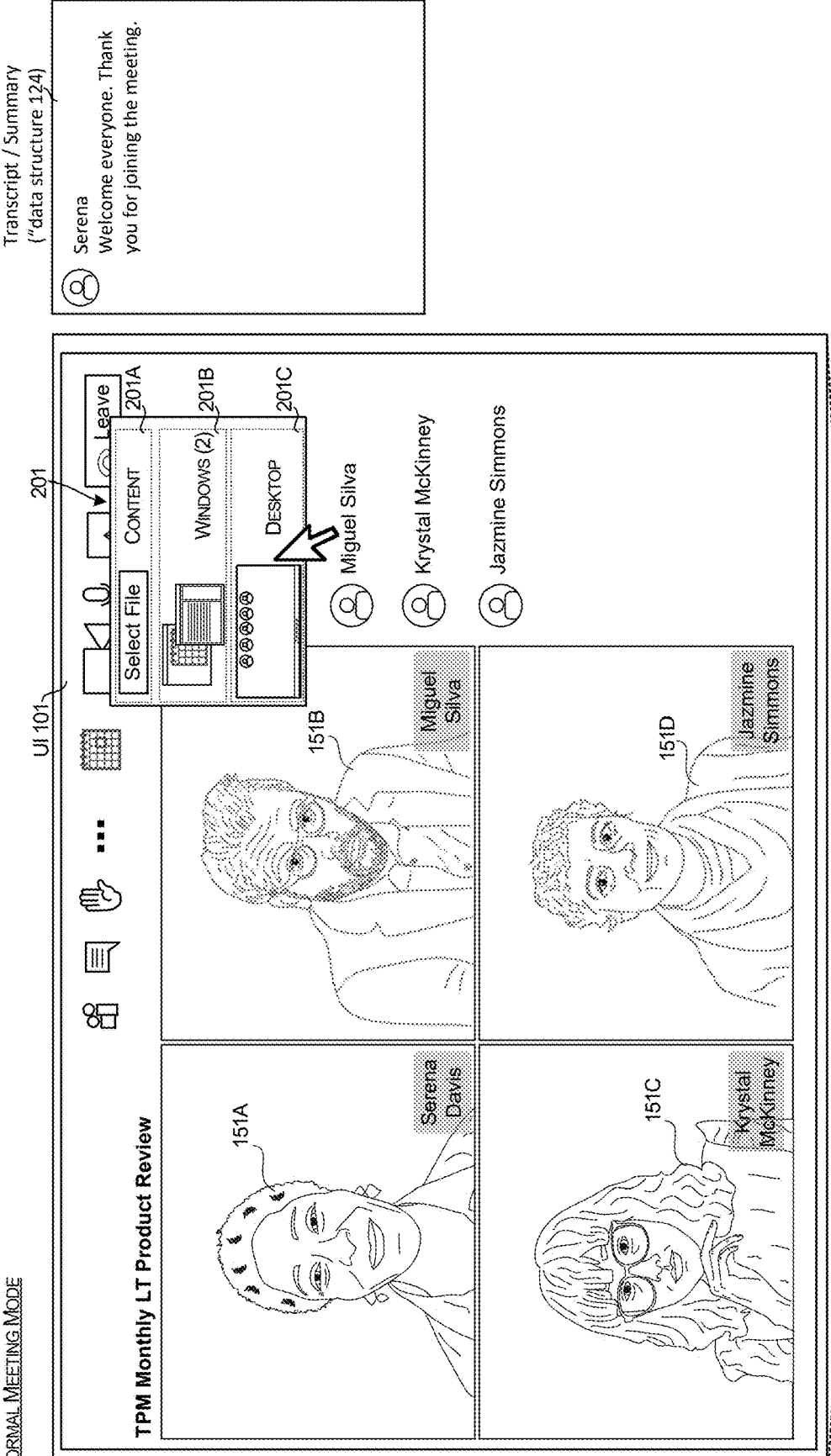
FIG. 1B illustrates a user interface displayed in normal meeting mode receiving an input to transition a computer from the normal meeting mode to a screen sharing mode.

Meeting transcripts or meeting summaries can be generated by identifying content from communication data exchanged between participants of an online meeting. The content of the communication data can include any content that is shared in audio streams or messages shared between participants of a meeting. FIGS. 1A and 1B show an example of a first device starting in a first mode of operation, e.g., normal meeting mode, where audio streams and messages are shared between users without that device sharing a display of a desktop environment. These operations include invoking a communication session, e.g., a meeting, in a normal meeting mode for communicating audio streams and messages between a plurality of computing devices 11A-11H, where the normal meeting mode is invoked and maintained when the computing devices 11A-11H are not in screen sharing mode communicating a display of the application file.

FIG. 1A illustrates a first phase of the process where a user interface is displayed on a first device 11A in normal meeting mode. In the normal meeting mode, the first computer 11A can record transcripts and generate summaries while allowing the meeting participants to communicate using text data, audio data and video data. In normal meeting mode, the user can select a menu item 105 to cause the display of a sharing menu.

FIG. 1B illustrates a user interface displayed in normal meeting mode where the first device 11A receives an input at the sharing menu 201 to transition the device from the normal meeting mode to a screen sharing mode. A first menu item 201A can be selected to share a file, a second menu item 201B can be selected to share specific windows, and a third menu item 201C can be selected to display a shared desktop on the screens of other devices 11B-11H of the other users. In this example, the user input indicates a selection of the third menu item 201C, which invokes a screen sharing mode where the first device displays a rendering of its desktop with other devices 11B-11H of the communication session.

Figure 1C:
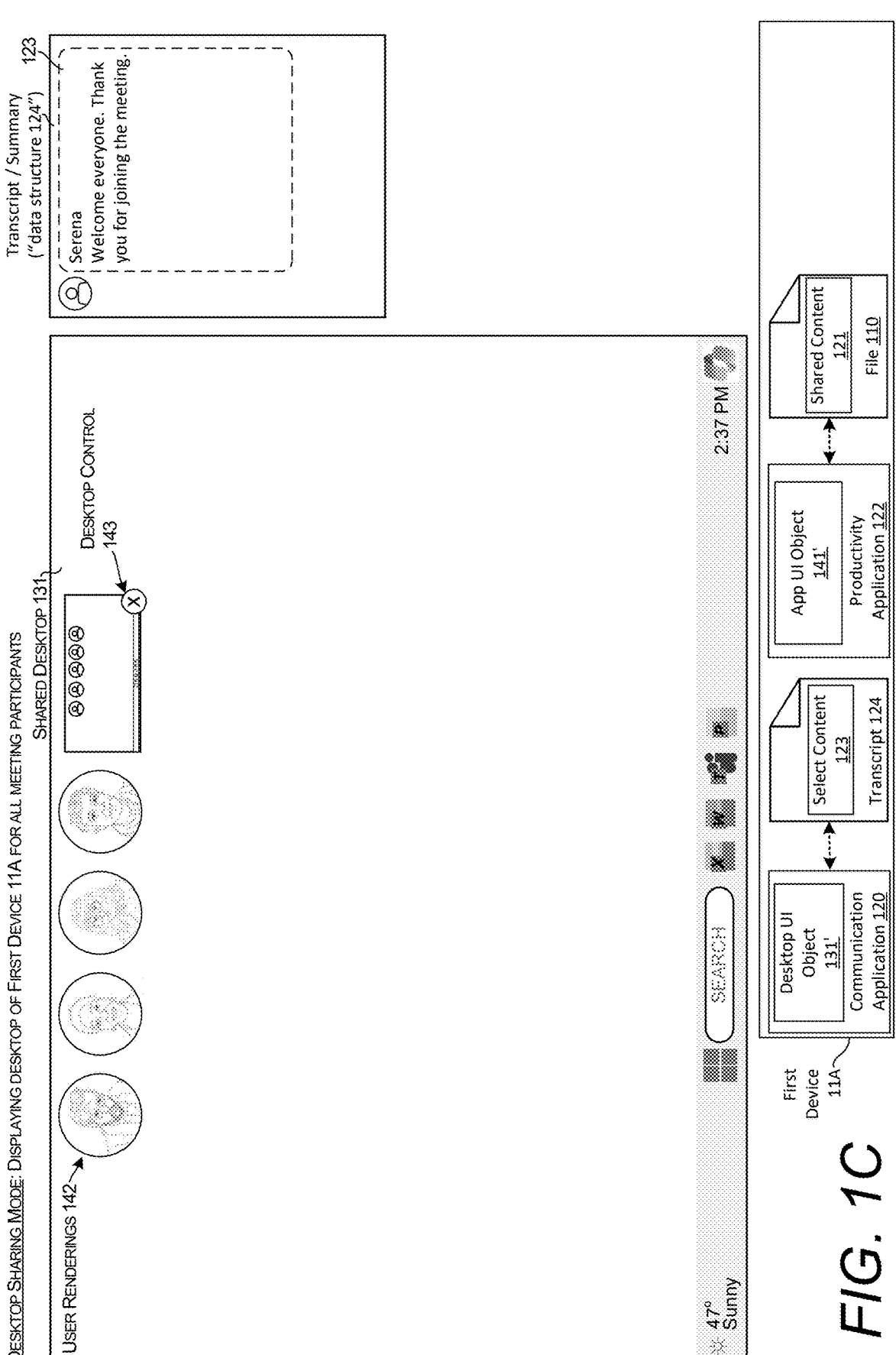
FIG. 1C illustrates a user interface displayed on a first computer in screen sharing mode, the first computer identifying content from communication data to generate a summary or transcript.

FIG. 1C illustrates a user interface displayed on a first device 11A in screen sharing mode. In screen sharing mode, the first device displays a rendering of its desktop, referred to as a shared desktop 131, on the screens of all devices 11A-11H participating in the meeting. Also shown, the shared desktop also includes individual user renderings 142. These renderings can show live video streams of individual meeting participants or static images of individual participant. These renderings can be statically located on the desktop and appear over other windows that are displayed on the desktop. In addition, a control element 143 can be configured to terminate the screen sharing mode and return the device to normal meeting mode in response to a user selection. Although this embodiment refers to a desktop share, a content share or a file share also includes any technical features where a computer displays a file using an application and a rendering of that file is displayed on computers of other meeting participants.

In some embodiments, the screen sharing mode is activated in response to at least one computer invoking a screen share of a desktop with a file displayed using a productivity application. For example, during the communication session, the first computing device 11A invokes a screen sharing mode which includes executing a productivity application displaying shared content 121 of the application file 110. A communication application causes a display of a rendering of a desktop environment 131 shared by the first computing device 11A on display screens of the plurality of computing devices 11A-11H of the communication session.

While in screen sharing mode, the system analyzes communication data to identify content 123 (also referred to herein as "select content 123") for a meeting summary or a meeting transcript. In some embodiments, the system creates meeting transcripts or summaries for a real-time discussion based on audio signals and/or chat messages relating to the shared contents. As shown, as the participants are talking in the meeting, the system captures the audio stream of each user, and transcribes the audio streams into text and inserts the text to the meeting transcript or a meeting summary. For illustrative purposes, the meeting summary or the meeting transcript can be referred to herein as a "data structure 124." This can include operations for processing the audio streams and the messages communicated between the plurality of computing devices 11A-11H to identify the content 123 from the audio streams and the messages of the communication session.

FIG. 1C also shows additional aspects of a client device, such as the first device 11A. Any of the client devices 11 that invokes a screen sharing mode can include the execution of a communication application 120 that manages the communication between the participants. The communication application can also manage the shared desktop 131 that is displayed on the client devices of each participant of the meeting. The shared desktop 131 is displayed on a display screen using a corresponding desktop UI object 131'. The communication application can also generate, maintain, and store a meeting transcript or a meeting summary including the select content 123. The client devices can also include a productivity application 122 configured to display and modify the contents of a file 110. The contents of the 110 are referred to herein as the shared content 121.

Figure 1D:
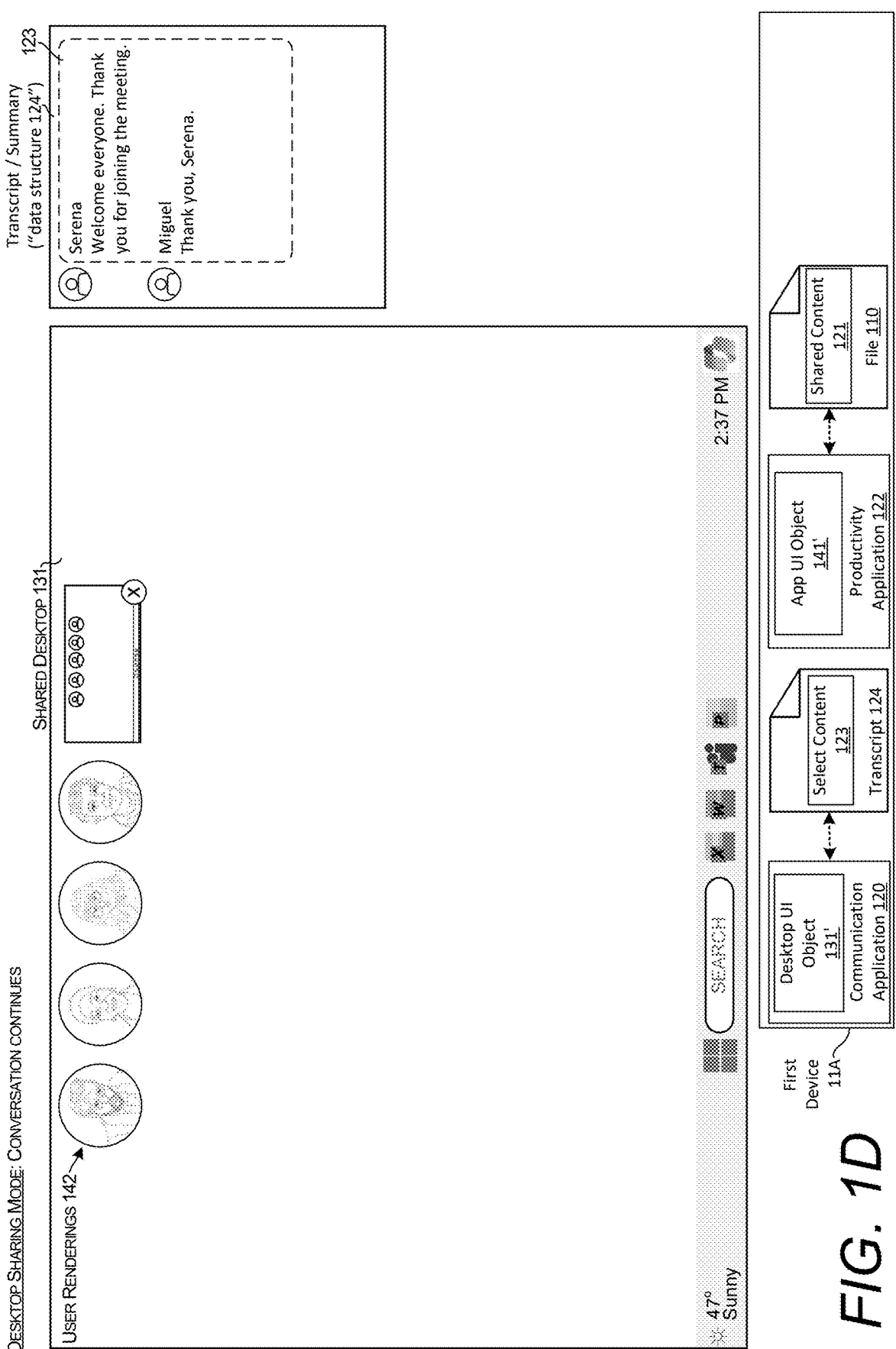
FIG. 1D illustrates a user interface on a first computer in screen sharing mode where additional communication data is received from meeting participants for the transcript or summary.

FIG. 1D illustrates a user interface on a first computer in screen sharing mode, which is displayed while additional communication data is received from meeting participants. As shown, the system captures the audio streams of each user in real time and transcribes their speech into text as the meeting progresses. The text of the communication data is included in the data structure 124 if the communication data meets one or more criteria. For instance, if the data structure is a transcript, the system determines that a majority of the communication data is determined to be select content except for a few filtered words and phrases, e.g., profanity, controversial terms, etc. However, if the data structure is a meeting summary, the system will only select portions of the communication data that meet one or more criteria. For example, select portions of the communication are determined to be select content for a summary if a statement pertains to the application file, a particular context, a particular person, or a particular topic. In this particular example, Serena and Miguel are just exchanging general greeting statements and thus not included in the summary. This example is provided for illustrative purposes and is not to be construed as limiting. As described in more detail below, the select content can be derived from the communication data using any suitable criteria.

Figure 1E:
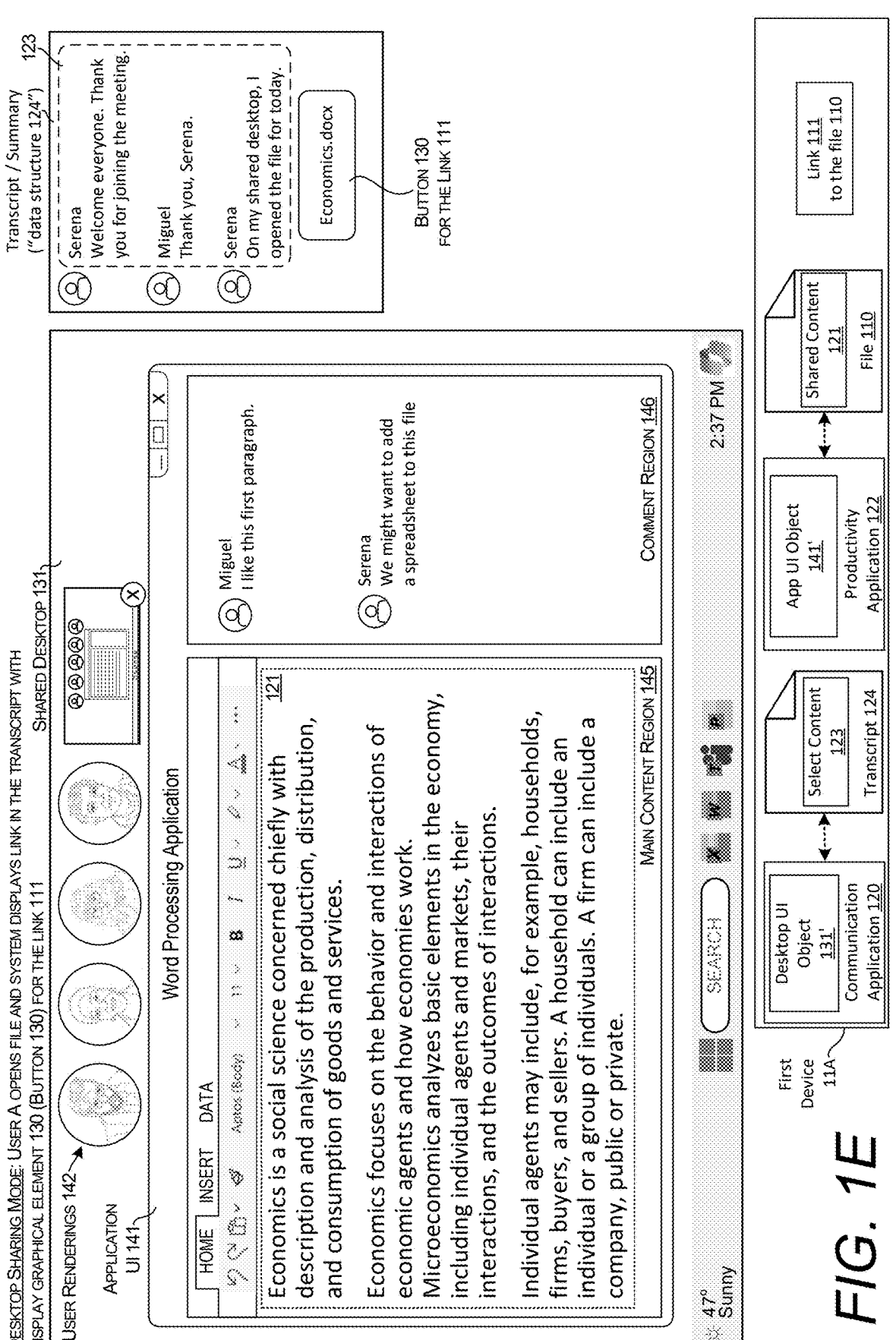
FIG. 1E illustrates a user interface on a first computer in screen sharing mode where a first participant displays shared content of a file in a productivity application, where a link to the file is inserted in the transcript or summary.
Figure 1F:
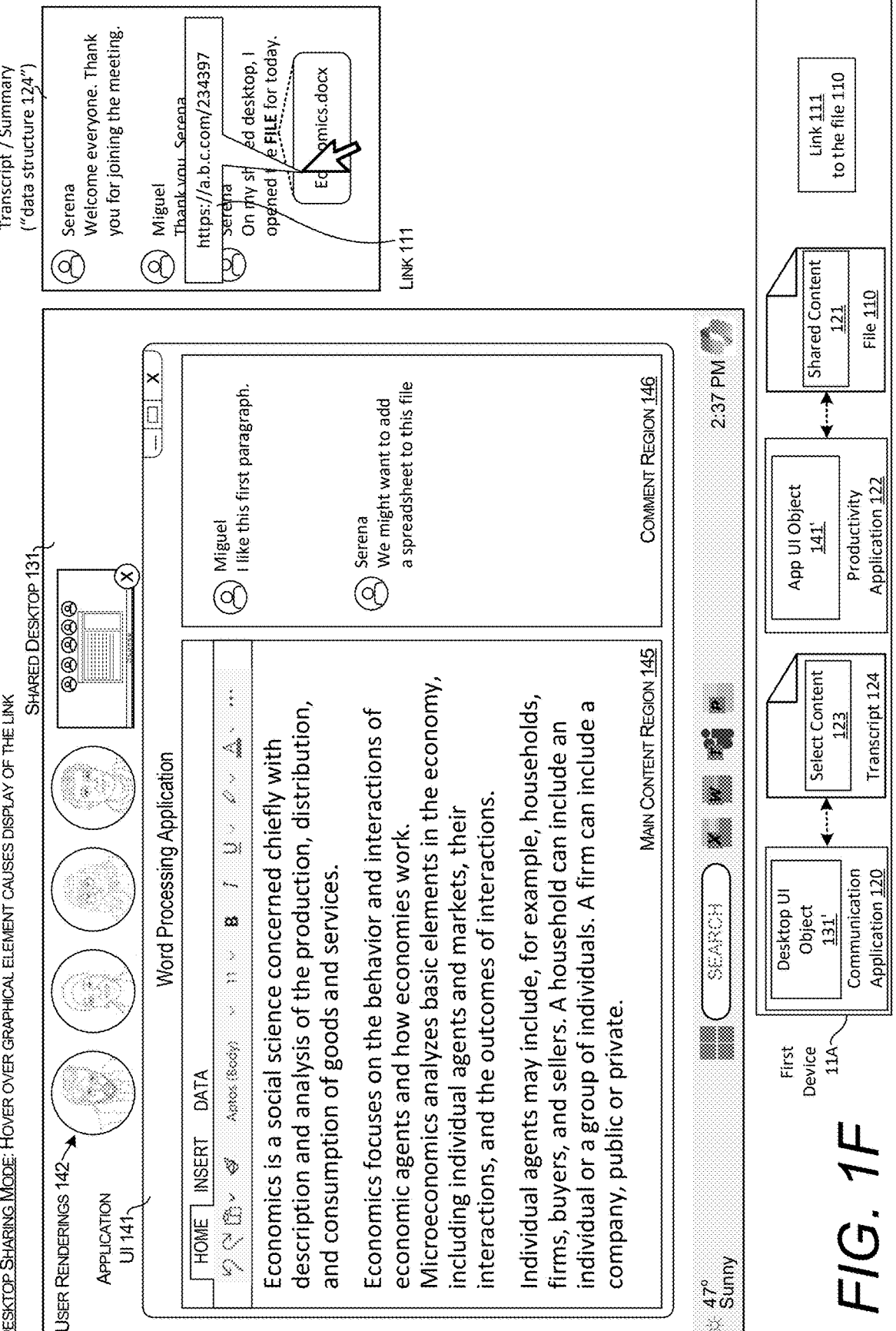
FIG. 1F illustrates a user interface where a link to a file is inserted in the transcript or summary of a meeting, and a hover input invokes a display of the link to the file.

FIG. 1E illustrates a user interface on a first computer in screen sharing mode where a first device 11A of the first participant 10A displays shared content of a file in a productivity application. This user interface is displayed in response to a file being selected for screen sharing mode during a meeting, the system generates a link to the file and inserts the link to the file in the transcript or summary, e.g., the data structure 124. When users are viewing the transcript or summary, the link can be displayed as a button 130 (graphical element 130) or by hyperlinked text in the transcript or summary that provides access to the link. FIG. 1F illustrates a user interface where a user input, such as a mouse-over hover input over the button 130, invokes a display of the link to the file.

In some embodiments, a link 111 (also referred to herein as a "reference 111") to the file 110 is generated based on one or more triggering events. For example, when a user shares a rendering of a file using a productivity application through a shared desktop, the system can generate a link 111 to the file 110. In another example of a triggering event, a link can be generated in response to a predetermined input gesture or a predetermined vocal instruction stated in an audio stream or message of the meeting. A person may state in the audio stream that they "wish to have access to the file" or someone may state that "permissions to the file should be changed to give access to everyone," etc. These types of instructions can caused the system to generate the link to the file but also change the permissions for the file itself.

Figure 2A:
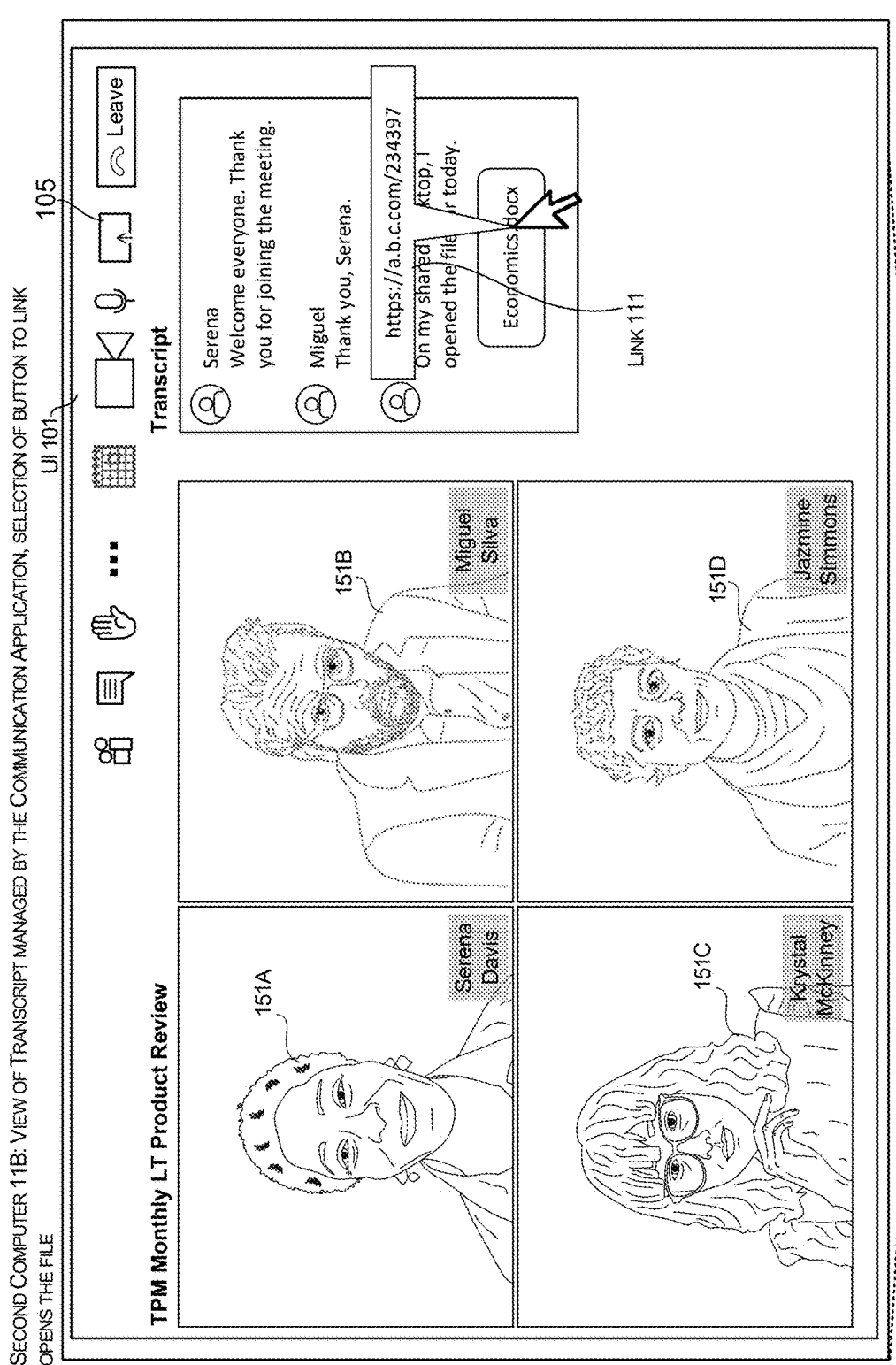
FIG. 2A illustrates a user interface displayed on a second computer showing a transcript or summary having a link to a file displayed in a screen share of a meeting.

FIGS. 2A-2B show an example of how the link in a transcript/summary can be used to cause a display the file 110. FIG. 2A illustrates a user interface displayed on a second computer showing a transcript or summary having a link 111 to the file that was displayed during a screen share. FIG. 2B illustrates a user interface displayed on the second computer in regular operating mode, the second computer displaying the file 110 in a productivity application that is invoked in response to a selection of a link to the file.

In some embodiments, the link (or "reference") to the file can cause a display of a section of the application. A section of the application file can include a page of a document, select cells of a spreadsheet, a page of a slide deck, etc. Each page of a document can be marked with an identifier, referred to herein as a section identifier. Thus, as shown in FIG. 2A, the system can cause a display of the data structure (the meeting summary or the meeting transcript) on a computer, such as the second computing device 11B. The display of the data structure includes a display of the content derived from the communication data and the reference to the application file. Then, as shown in FIG. 2A, the computer receives an input indicating a selection of the reference having a section identifier for a section of the application file. This can include a specific page number. In response to the input indicating the selection of the reference having the section identifier for the section of the application file, the system causes the application to identify the section of the application that pertains to the section identifier, and cause a display of the section of the application file that pertains to the section identifier.

Figure 3A:
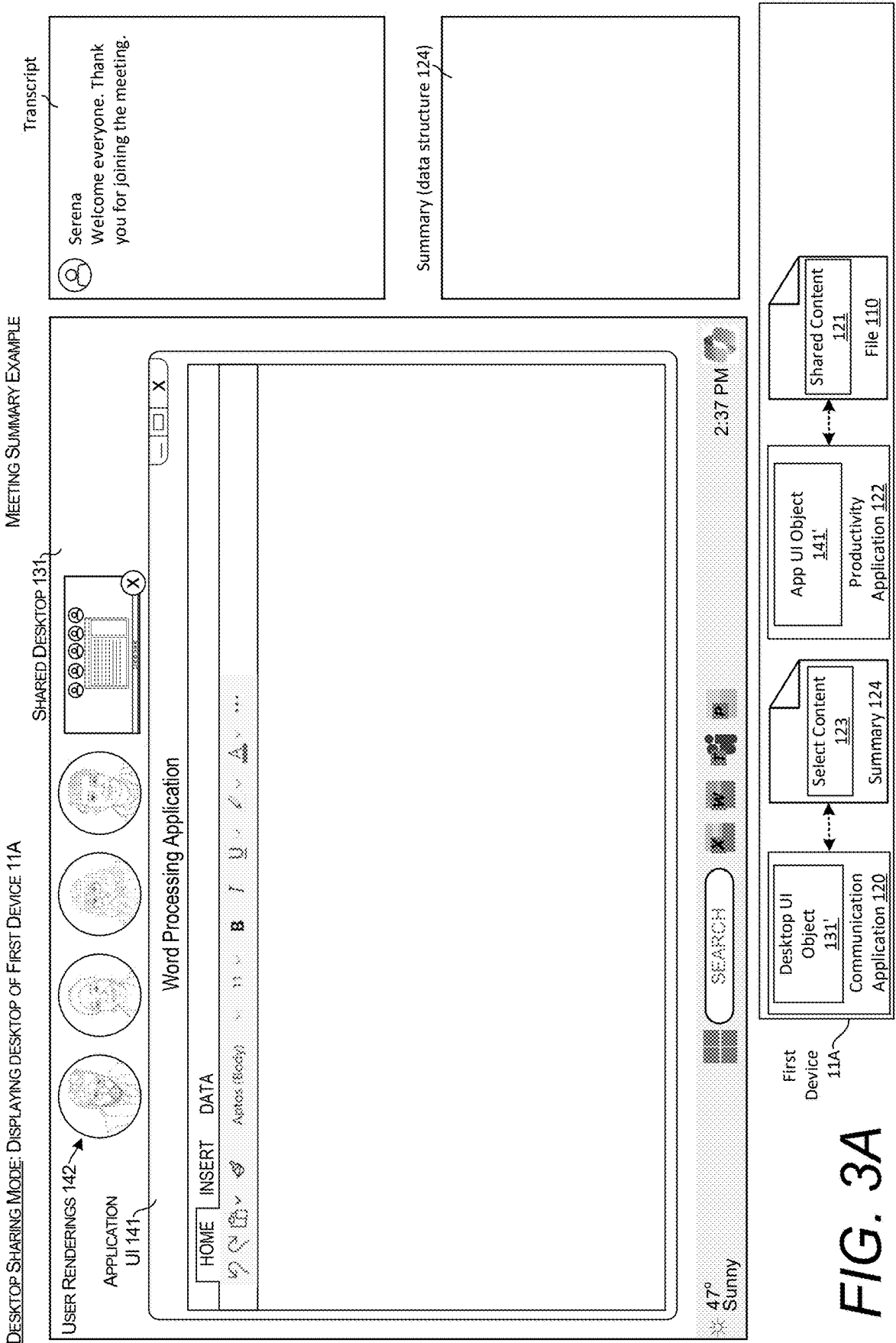
FIG. 3A illustrates a user interface displayed on a first computer in screen sharing mode, the first computer or system analyzing communication data to identify content for a meeting summary.
Figure 3B:
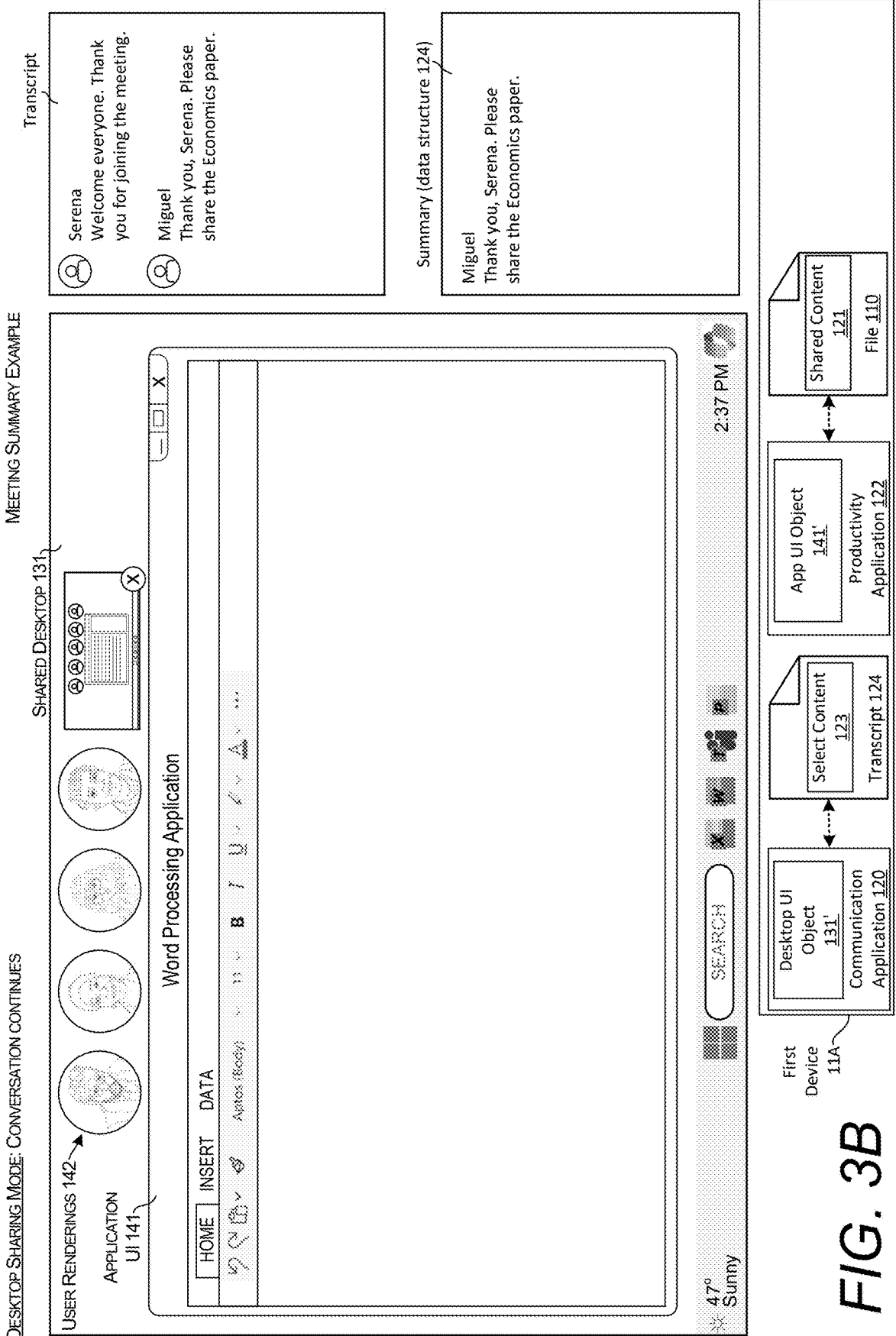
FIG. 3B illustrates a user interface on a first computer in screen sharing mode where additional communication data is received during a meeting but not being selected for inclusion in a meeting summary.

FIGS. 3A-3B show another example where the transcript of the meeting is analyzed to identify select content for a meeting summary. In such embodiments, the system can analyze the communication data and identify select content based on one or more criteria. A transcript may include all words that are spoken during a meeting. Conversely, the system can generate a meeting summary based on phases or actions that pertain to a particular topic or person. For example, as shown in FIG. 3A, a transcript generated from an audio stream may start with a general statement, such as "Welcome everyone. Thank you for coming to the meeting." If the system determines that the statement does not pertain to a particular person, topic, or pertain to the shared application file, the system does not select statements for inclusion in the summary.

If the system determines that a statement or action pertains to a particular person, topic, or pertains to the shared application file, the system selects such statements or descriptions of those actions for inclusion in the summary. For example, FIG. 3B shows that another person provided a statement regarding the shared document. In response, the system includes such statements, or descriptions of such statements, in the summary.

Figure 3C:
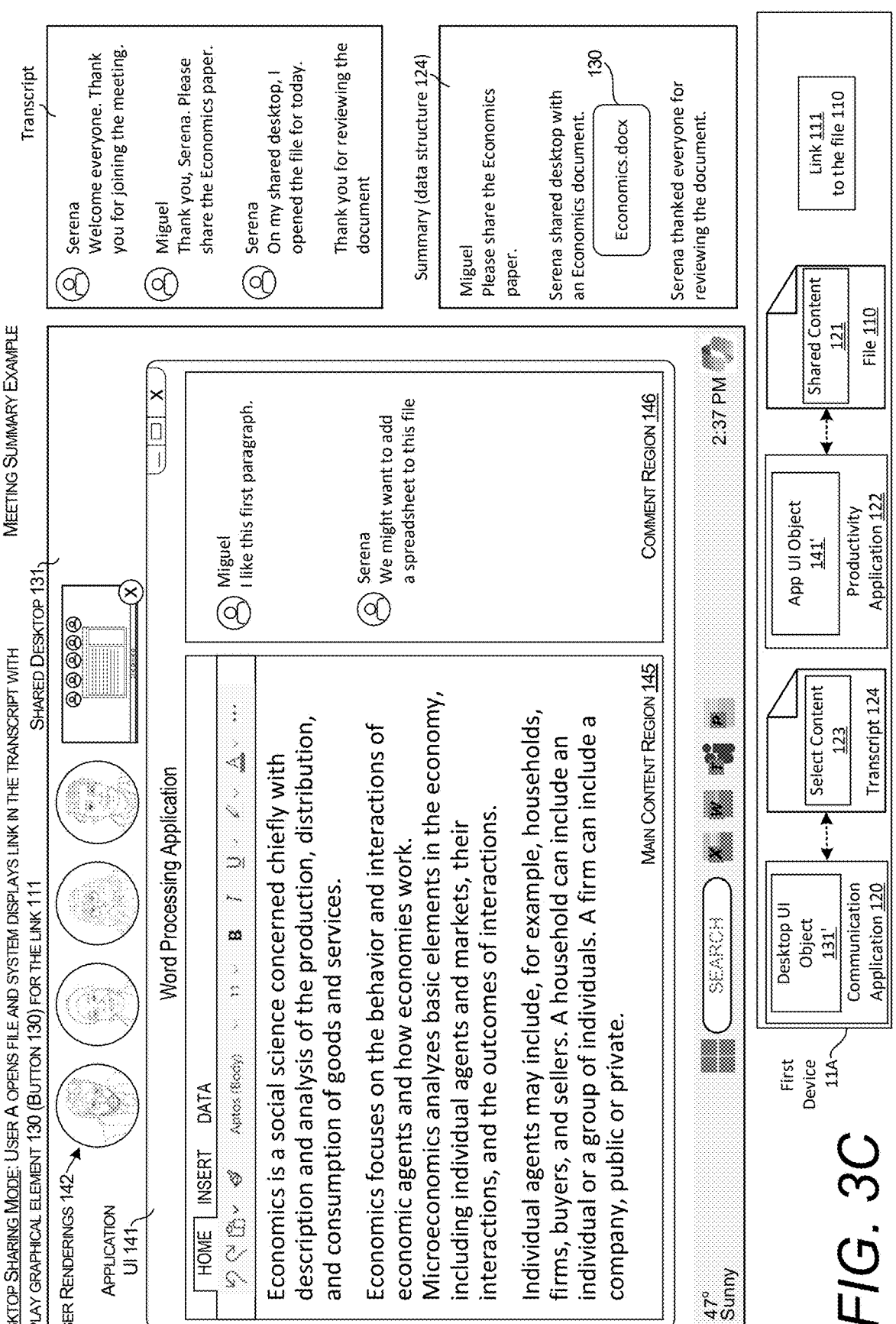
FIG. 3C illustrates a user interface on a first computer in screen sharing mode where additional communication data is received during a meeting and selected for inclusion in a meeting summary that includes a link to a file displayed in a shared desktop environment.

The system may also identify select content for inclusion in the summary based on the detection of predetermined gesture inputs or specific activity in a meeting. As shown in the example of FIG. 3C, when a person shares a specific file in the shared desktop, the system may generate a description of the action, e.g., Serena shared a desktop with an Economics document. In addition, the system provides a link 130 to the shared application file. Since Serena also provided a statement in an audio stream pertaining to the document, e.g., Thank you for reviewing the document, such statements or a description of the statement is included in the summary.

The example of FIG. 3C also shows that the system can also determine a position of the link 130 within the summary. In some embodiments, the position of the link can be based on the timing of an input gesture or statement. For example, if a person shares the file at a particular time in a meeting, and an outline of the summary is based on a timeline, the link to the file is inserted at a position associated with a position of a related statement. For example, the link to the file can be placed next to a statement by the user, "I am sharing a file on my desktop now." In another example, the link to the file can be placed next to a description of a predetermined input or action. When a user provides an input to start sharing a document, the system can generate a statement in the transcript or summary noting that the user has started sharing a file. The system can then position the link to the file in proximity to that computer-generated statement.

Figure 4A:
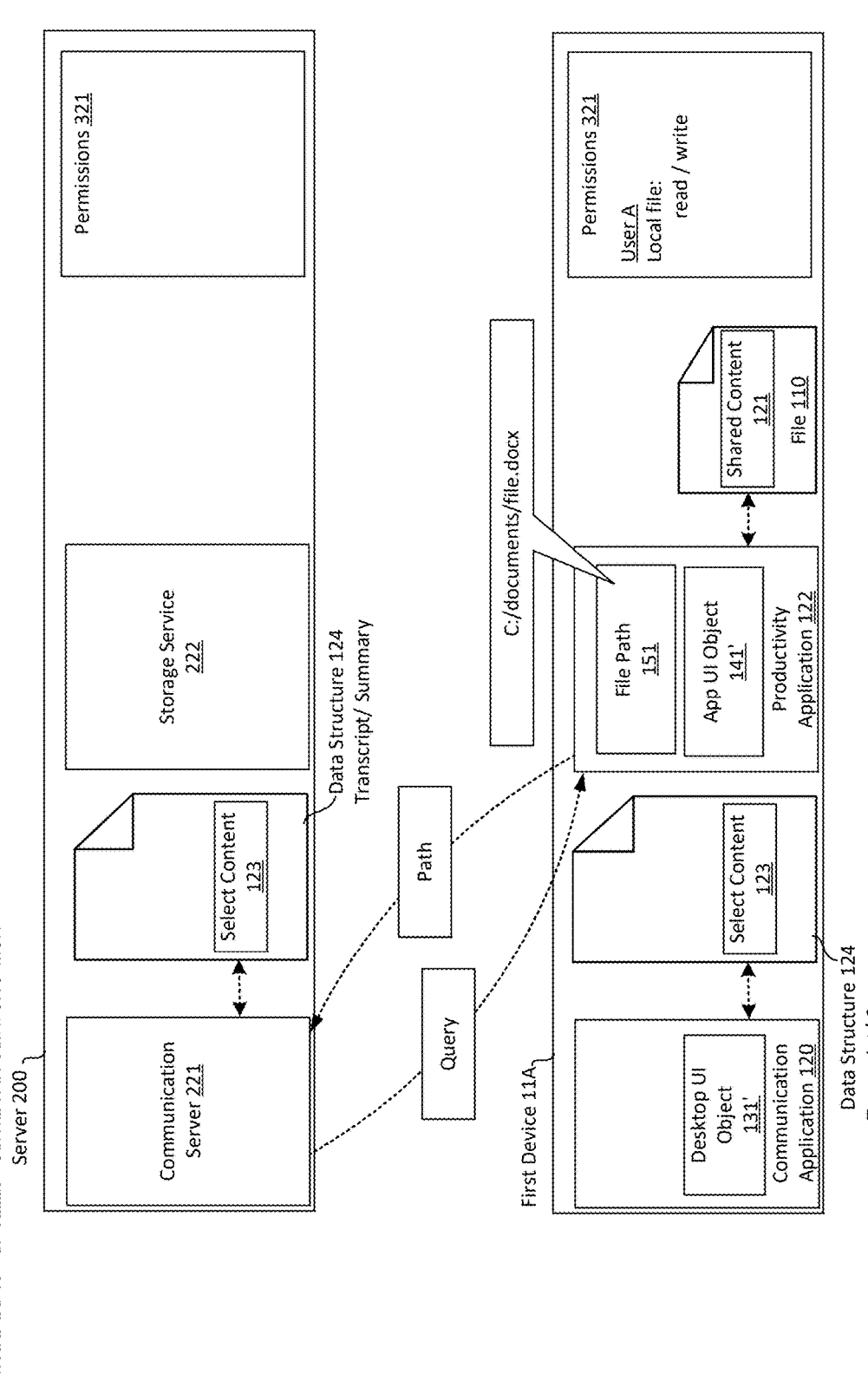
FIG. 4A illustrates a block diagram of a system for identifying a location of a file that is stored on a client device.
Figure 4B:
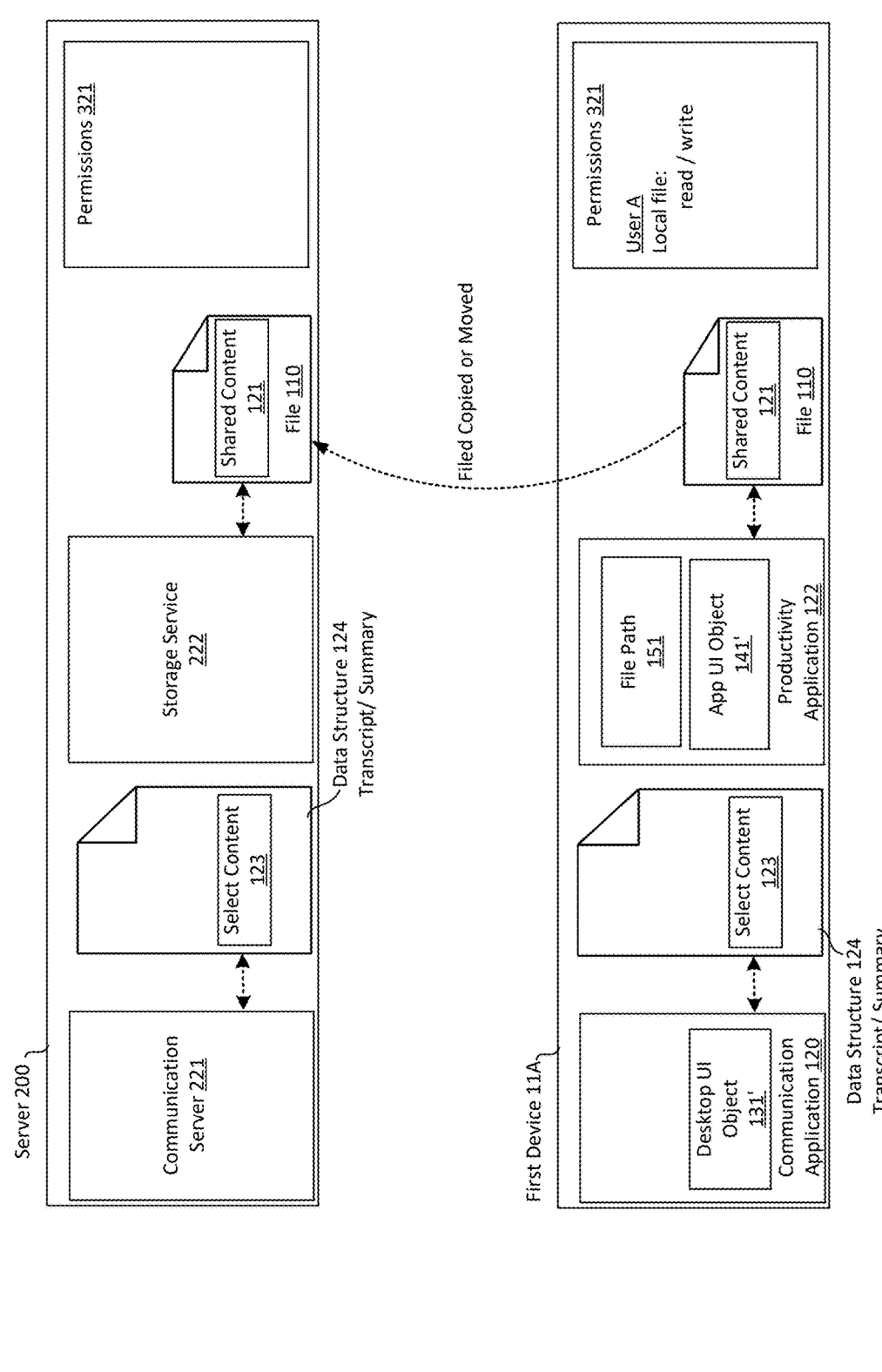
FIG. 4B illustrates a block diagram of a system for identifying a location of a file that is stored on a client device, the system performing operations for moving or copying the file to a server.

The system can identify the location of a file for purpose of generating a link to the file. FIGS. 4A-4C show an example of a process where the system identifies the location of a file that is stored on a client device. As shown in FIG. 4A, when a file is shared in screen sharing mode, the system identifies the location of that file by sending a query to the productivity application and/or a storage service 222 to retrieve a path indicating a storage location of the application file. In this example, the path shows that the application file 110 is stored on the client device 11A. In response to determining that the application file 110 is stored on the first computing device, as shown in FIGS. 4A and 4B, the system copies or moves the application file 110 from the first computing device to the storage service 222 of a server 200. Then, as shown in FIG. 4C, the system generates a link to provide access to the application file that is stored on the storage service 222. Also shown in FIG. 4C, the system configures the permissions for the link to permit attendees of the communication session to view and edit the application file using the link. These changes can also be applied to a copy of the file stored on the client device 11A.

Figure 5A:
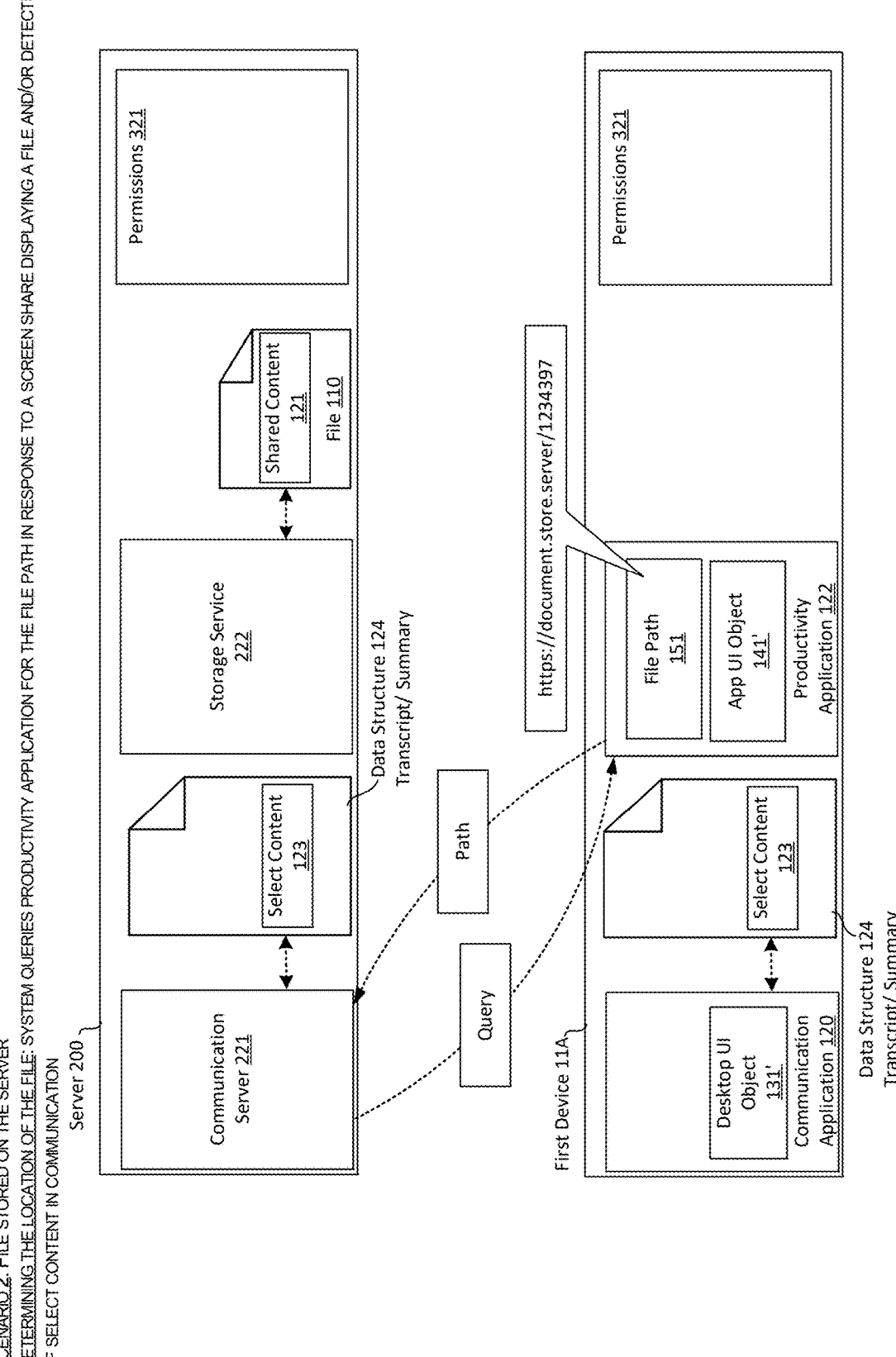
FIG. 5A illustrates a block diagram of a system for identifying a location of a file that is stored on a server.
Figure 5B:
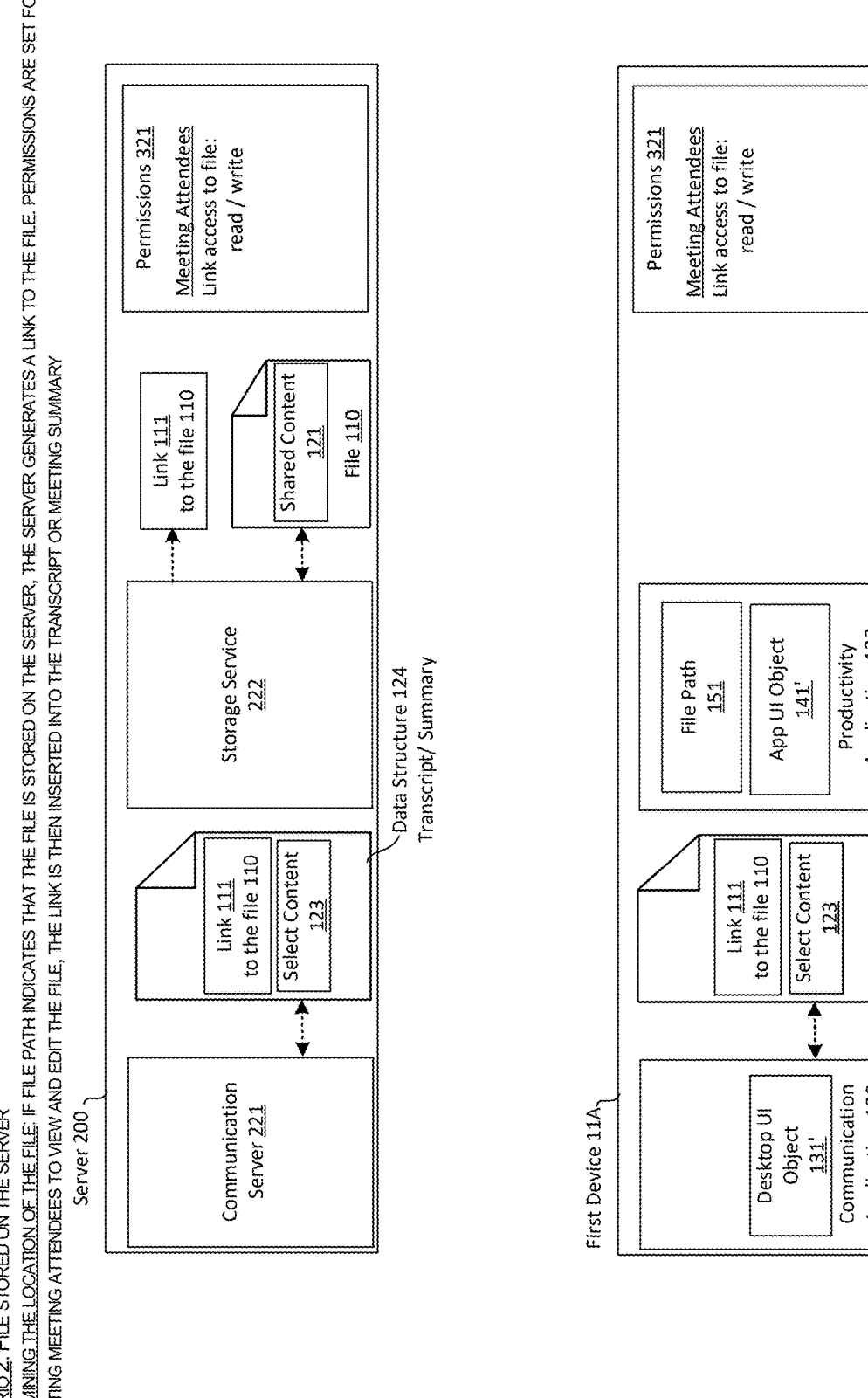
FIG. 5B illustrates a block diagram of a system for identifying a location of a file that is stored on a server, the system performing operations for generating a link to the file for inclusion in a transcript or summary.

FIGS. 5A-5B show an example of a process where the system identifies the location of a file that is stored on a server 200. As shown in FIG. 5A, when a file is shared in screen sharing mode, the system identifies the location of that file by sending a query to the productivity application and a storage service 222 to retrieve a path indicating a storage location of the application file. In this example, the path shows that the application file 110 is stored on a storage service 222 of the server 200. In response to determining that the application file 110 is stored on the storage service 222 of the server 200, as shown in FIGS. 5A and 5B, the system generates a link 111 to provide access to the application file 110 that is stored on the storage service 222. Also shown in FIG. 5B, the system configures the permissions for the link to permit attendees of the communication session to view and edit the application file using the link.

FIGS. 6A-6F illustrate a process for automatically inserting content from meeting summaries and/or meeting transcripts in an application file communicated during a meeting screen share. In this example, during an online meeting, a presenter, such as User A using the first device 11A, starts a screenshare an application file such as Word doc, PowerPoint, Excel, etc. The file resides locally on the presenter's machine or at a server, such as a OneDrive server. The system then creates meeting transcripts or meeting summary for the real-time discussion based on audio signals and/or chat messages relating to the shared contents, e.g., the shared file. The server also determines the location of the application file that is being shared which a computing device is in a screen sharing mode; and then inserts at least a portion of the meeting transcripts or meeting summary in the application file.

Figure 6A:
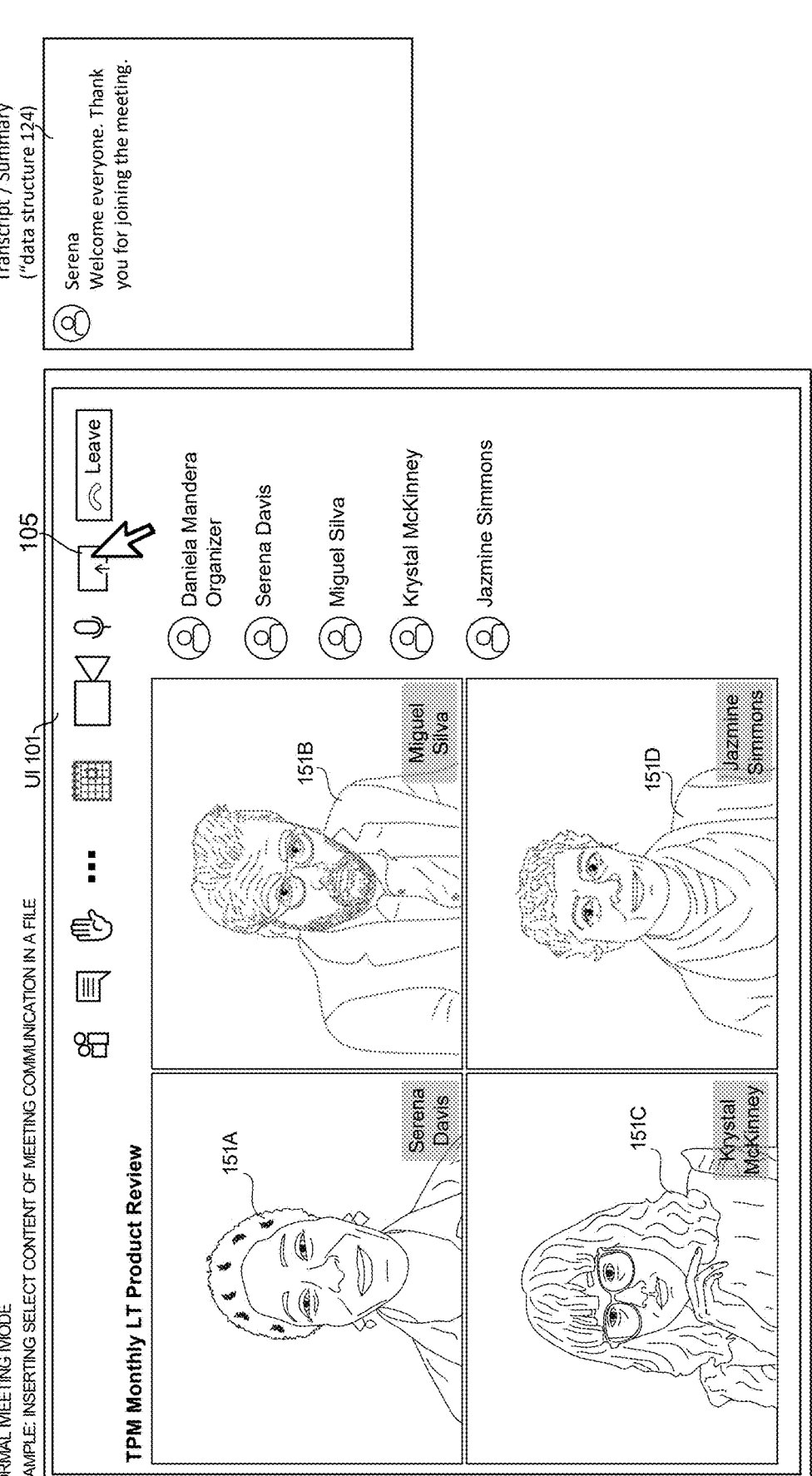
FIG. 6A illustrates a first phase of a process where content of meeting communication is inserted in a file, this phase showing a user interface displayed on a first computer in normal meeting mode.
Figure 6B:
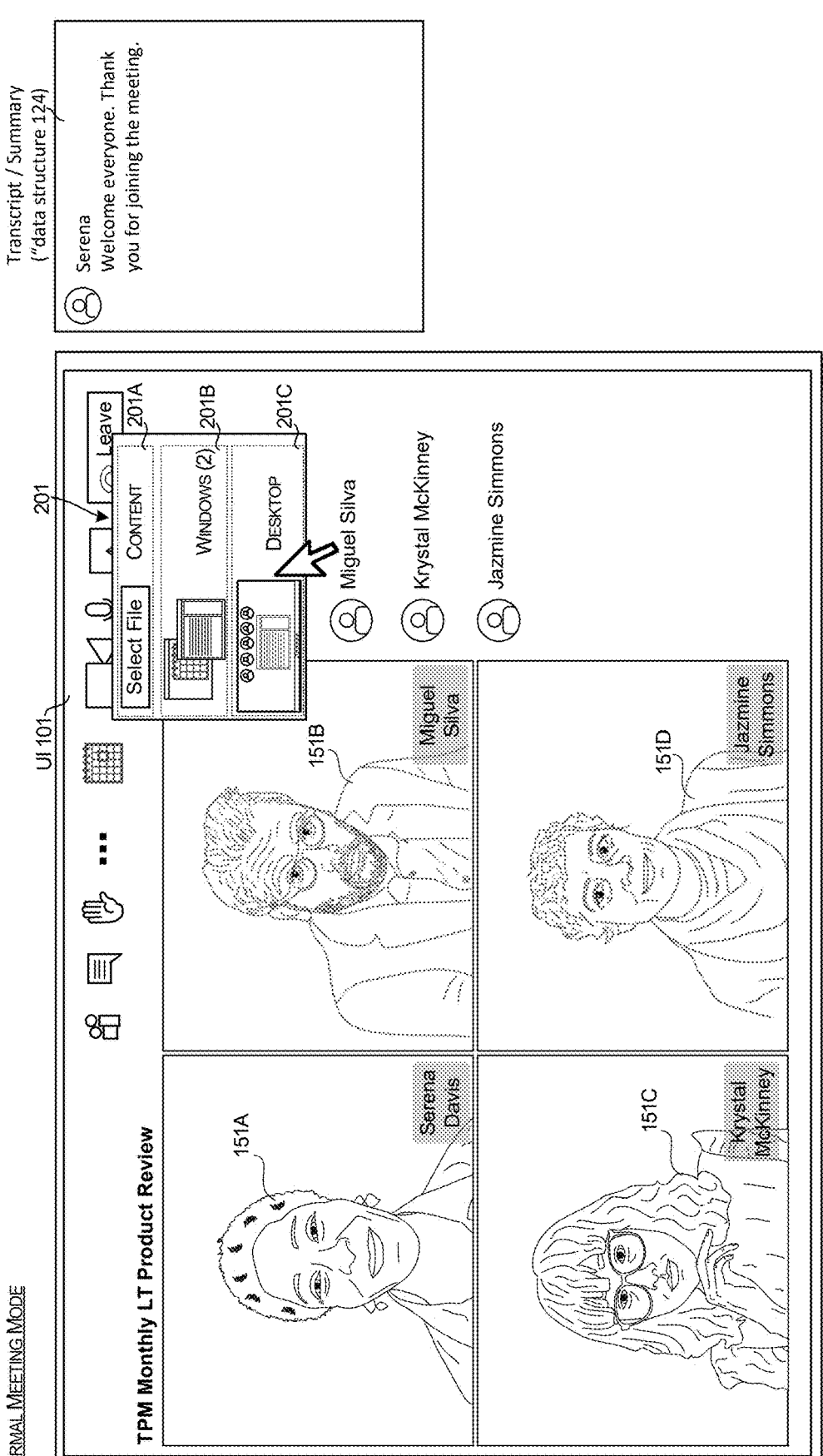
FIG. 6B illustrates a user interface receiving an input to transition from a normal meeting to a screen sharing mode.

Meeting transcripts or meeting summaries can be generated by identifying select content from communication data exchanged between participants of an online meeting while one user is in screen sharing mode. The select content of the communication data can include any content that is shared in an audio stream between the participants or in messages exchanged between the participants. FIGS. 6A and 6B show an example of a first device starting in a first mode of operation, e.g., normal meeting mode, where audio streams and messages are shared between users without any device in the meeting sharing a display of a desktop environment. These operations include invoking a communication session, e.g., a meeting, in a normal meeting mode for communicating audio streams and messages between a plurality of computing devices 11A-11H, where the normal meeting mode is invoked when the computing devices 11A-11H are not in screen sharing mode communicating a display of the application file.

FIG. 6A illustrates a first phase of the process where a user interface is displayed on a first device 11A in normal meeting mode. In the normal meeting mode, the first computer 11A can record transcripts and generate summaries while allowing the meeting participants to communicate using text data, audio data and video data. In normal meeting mode, the user can select a menu item 105 to invoke a sharing menu.

FIG. 6B illustrates a user interface displayed in normal meeting mode where the first device 11A receives an input at the sharing menu 201 to transition the device from the normal meeting mode to a screen sharing mode. A first menu item 201A can be selected to share a file, a second menu item 201B can be selected to share specific windows, and a third menu item 201C can be selected to display a shared desktop on the screens of other devices 11B-11H of the other users. In this example, the user input indicates a selection of the third menu item 201C, which invokes a screen sharing mode where the first device displays a rendering of their desktop with other devices 11B-11H of the communication session.

Figure 6C:
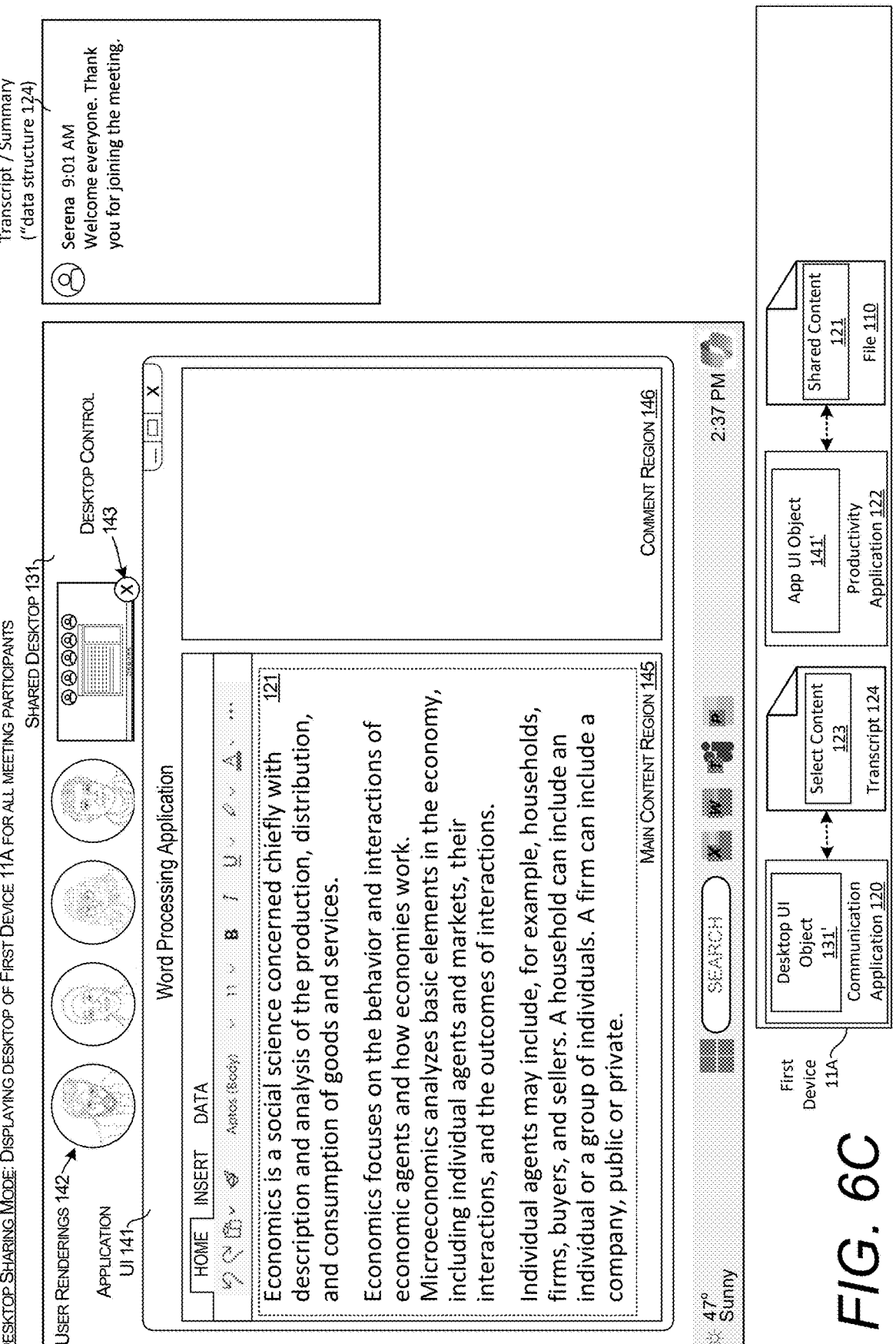
FIG. 6C illustrates a user interface displayed on a first computer in screen sharing mode for inserting content of communication data in a file, this phase showing receipt of communication data during a meeting but not being selected for inclusion in a file displayed in a screen share.

FIG. 6C illustrates a user interface displayed on a first device 11A in screen sharing mode. In screen sharing mode, the first device displays a rendering of a desktop, referred to as a shared desktop 131, on the screens of other devices 11A-11H participating in the meeting. Also shown, the shared desktop also includes individual user renderings 142. These renderings can show live video streams of each user or static images of each user. These renderings can be statically located on the desktop and appear over other windows that are displayed on the desktop. In addition, a control element 143 can be configured to terminate the screen sharing mode and return to normal meeting mode in response to a user selection.

In some embodiments, the screen sharing mode is activated in response to at least one computer invoking a screen share of a desktop with a file displayed using a productivity application. For example, during the communication session, the first computing device 11A invokes a screen sharing mode which includes executing a productivity application displaying shared content 121 of the application file 110. A communication application causes a display of a rendering of a desktop environment 131 shared by the first computing device 11A on display screens of the plurality of computing devices 11A-11H of the communication session. As shown in FIG. 6C, the desktop environment 131 includes a rendering of the shared content 121 of the application file 110.

While in screen sharing mode, the system is configured to identify select content from communication data for inclusion in the file. In some embodiments, the system creates meeting transcripts or summary for the real-time discussion based on audio signals and/or chat messages relating to the shared contents. Then select content of the transcripts or summaries are inserted into the screen-shared file. As shown, as the participants are talking in the meeting, the system captures the audio stream of each user, and transcribes the audio streams into text and inserts the text to the meeting transcript or a meeting summary. For illustrative purposes, the meeting summary or the meeting transcript can be referred to herein as a data structure 124. In some embodiments, the system can analyze the audio streams or messages exchanged between the users to identify select content 123 to be added to the transcript or summary. This can include operations for processing the audio streams and the messages communicated between the plurality of computing devices 11A-11H to identify the select content 123 from the audio streams and the messages.

FIG. 6C also shows additional aspects of the client devices, such as the first device 11A. Any of the client devices 11 that can invoke a screen sharing mode can include a communication application 120 that manages the communication between the participants. The communication application can also manage the shared desktop 131 that is displayed on the client devices of each participant of the meeting. The shared desktop 131 is managed by the com- munication application executing a corresponding desktop UI object 131'. The communication application can also generate, maintain, and store a transcript or a meeting summary of select content 123. The client devices can also include a productivity application 122 configured to display and modify the contents of a file 110. The contents of the file 110 are referred to herein as the shared content 121.

In some embodiments, select portions of the meeting summary or the meeting transcript are inserted in the file. If a statement provided in the communication data, such as a shared message or a statement made in an audio stream, is detected as being from a particular person, or pertaining to a particular topic, or pertaining to the shared application file, the system selects such statements or descriptions of those actions for inclusion in the file. The system analyzes the audio streams and the messages communicated between the plurality of computing devices 11A-11F to identify select content having a threshold level of relevancy with the shared content 121 of the application file 110, a person, or a topic. The system then adds the select content having the threshold level of relevancy with the shared content 121 of the application file 110 to the data structure and/or inserts that select content in the file 110. In some embodiments, the select content is added to the comment region 146 of the file.

Figure 6D:
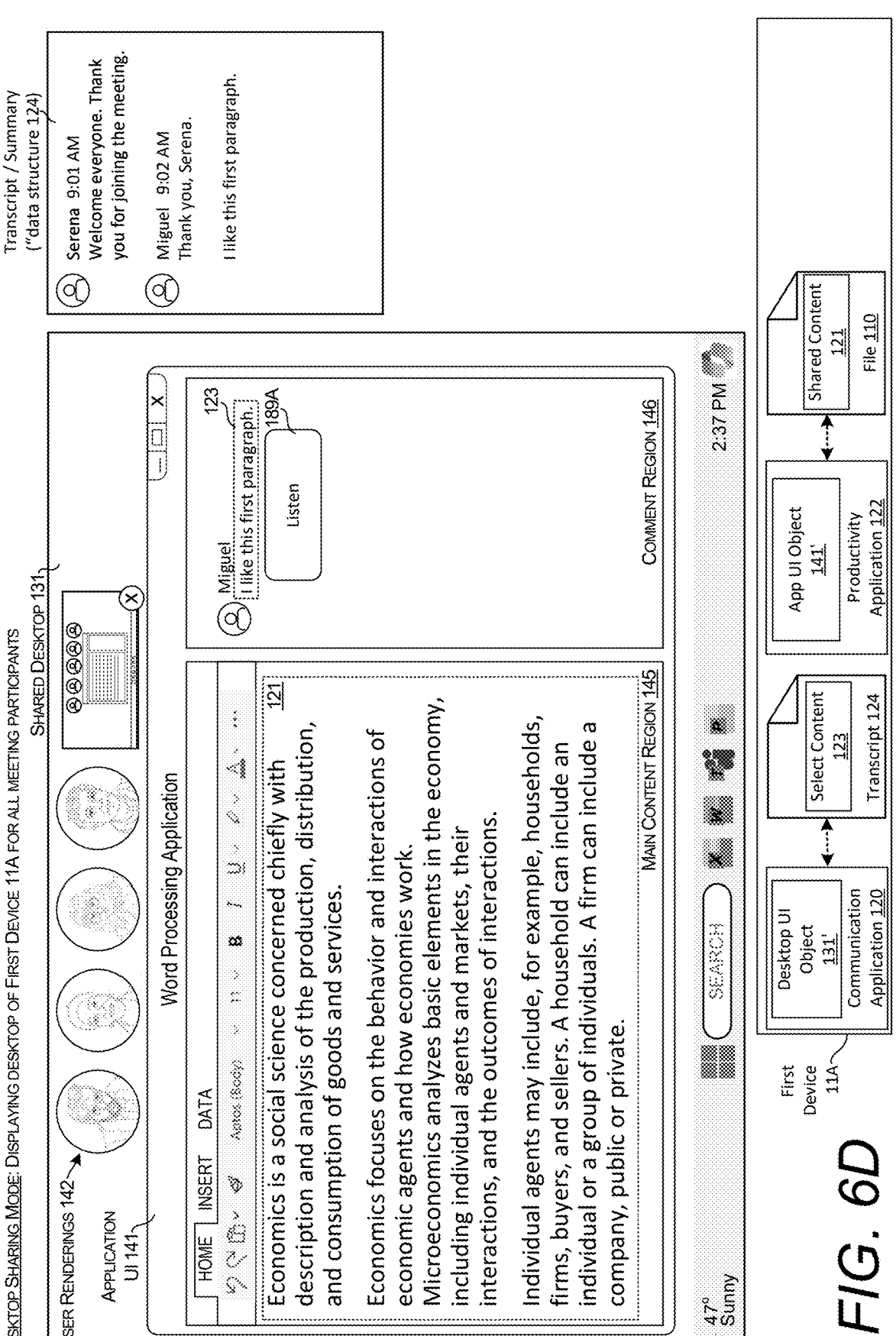
FIG. 6D illustrates a user interface displayed on a first computer in screen sharing mode where additional communication data is received, from which content is selected for insertion into the file.

In the example of FIG. 6C the statement made by Serena is not included in the file since the statement is not related to the document or related to a particular person or topic. However, as shown in FIG. 6D, Miguel makes a statement related to the document, e.g., "I like this first paragraph." This statement is determined as select content 123 since it refers to the document, and the statement is inserted into the file. However, the other statement that does not refer to the file, "thank you, Serena" is not included.

In addition, a link 189A is also inserted into the file. This link, when selected, causes a playback of an audio clip that includes a portion of the audio stream including the phrase "I like this first paragraph." The link 189A is inserted into the file is configured to play the audio stream of the meeting starting at 9:02 AM and only play for the 3 seconds that includes the relevant statement. The link can be configured to play for any predetermined period of time that includes the select content having a relevancy to the shared file, a particular person, or a particular topic.

In some configurations, the system can determine a position within the file to place the select content. For example, if the select content is a statement, e.g., "I like the first paragraph," that statement is placed in near the first para- graph. The comment can be added as an overlay over the first paragraph or in the comment section of the document. For spreadsheets and other graphical programs, the select content can be linked and activated for display by a input, such as a mouse hover or other activating input.

In some configurations, the system can position portions of the select content and proximity to sections of a file, e.g., sections of a document. The sections of a document can be a page, sentence, paragraph, word, or any other portion of a file. For other file formats, like spreadsheets, a section can be a cell or a section of cells, etc.

The system can select a particular section of a file based on a level of relevancy between the content of a particular section of the file and the select content derived from communication data. For instance, if a comment is made about a particular number or a particular cell of a spread- sheet, that comment can be placed as a link within the relevant cells.

Figure 6E:
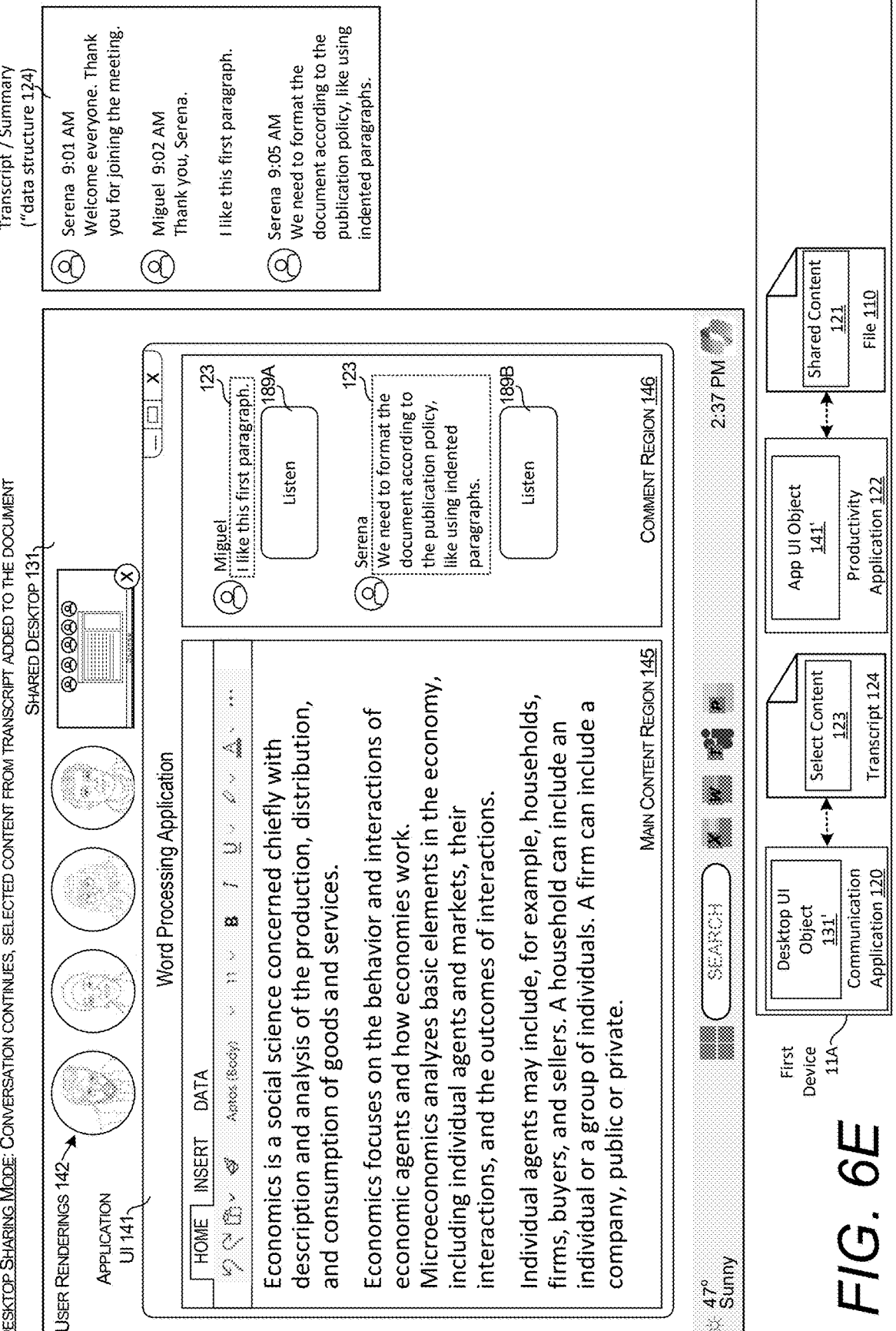
FIG. 6E illustrates a user interface displayed on a first computer in screen sharing mode where additional communication data is received, from which content describing edits to the file is selected for insertion into the file.

FIG. 6E shows an operating state where the system identifies additional select content from a statement made by Serena. In this example, Serena makes a statement related to the file. In response to determining that the statement is related to the file, that statement is identified as select content 123, and inserted into the file 110. Another link 189B is also added to the file, where this second link 189B is configured to play a portion of the meeting audio stream that includes Serena's statement.

Figure 6F:
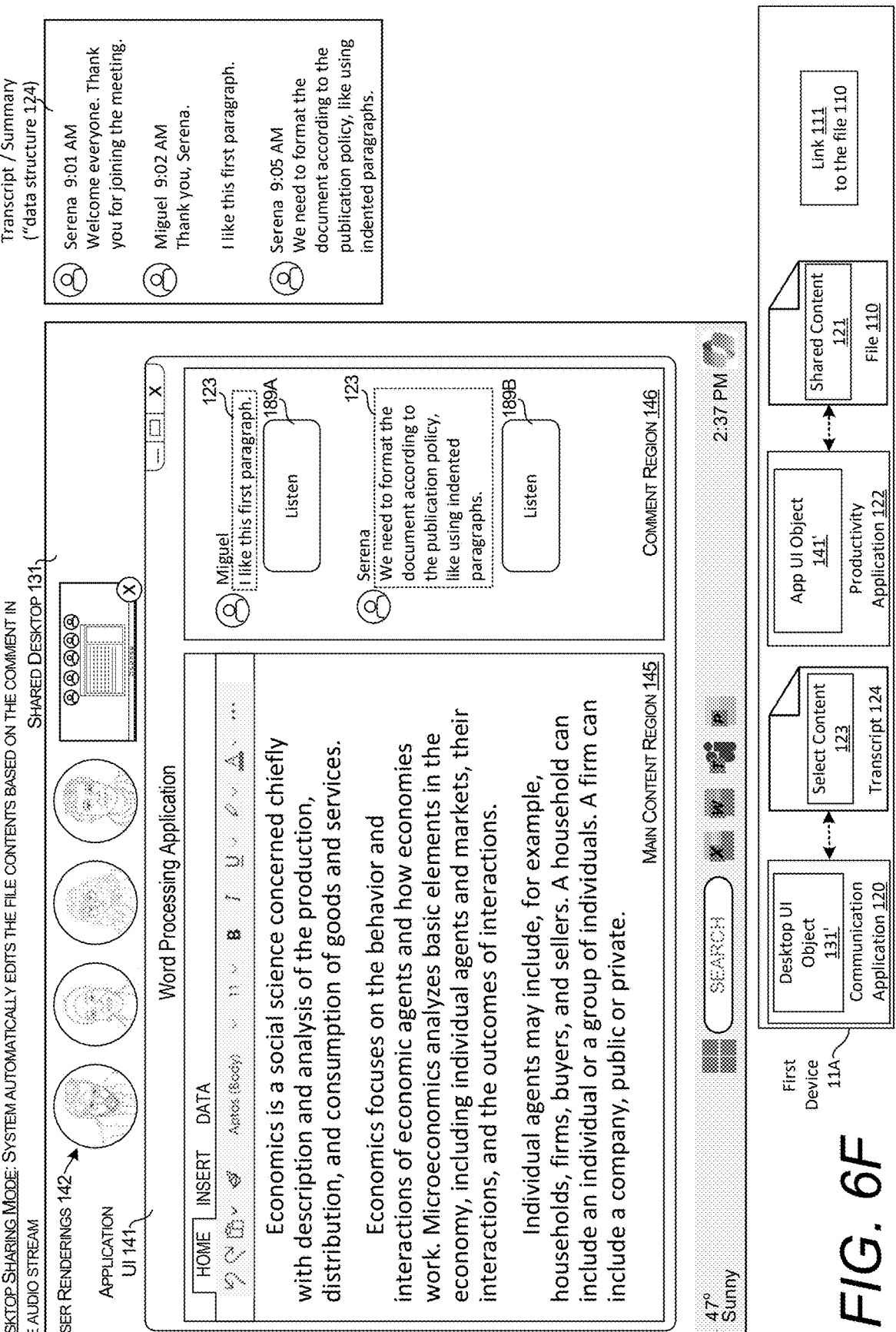
FIG. 6F illustrates a user interface displayed on a first computer in screen sharing mode where the system automatically edits a file during screen sharing mode using a description of edits to the file that originated from communication data of a meeting.

FIG. 6F shows an operating state where the system determines that Serena's statement includes edits to the file and the system automatically makes those edits to the shared content of the file. In this particular example, Serena's statement indicates that the paragraphs should include an indented format. In response to detecting these instructions, the system can interpret these instructions and make those changes to the content as shown in FIG. 6F. Although this example shows that the system can change the format of the document, the system is also configured to identify content that has to be inserted in the main content region of the document. For instance, if someone makes a proposal to add a second paragraph describing another subject, that content would be selected from the audio stream or a shared message between the meeting participants, and that's like content would be inserted into the main content region. In some embodiments, the edits to the file that are performed by the system based on the editing instructions interpreted from the meeting audio stream or messages are only displayed to a person with a predetermined role, such as a presenter or a person that provided the input causing the edit to the document. For example, in response to Serena's statement describing edits to the file, in some embodiments, the system makes those edits to the shared content of the file, and only displays those edits to Serena's computer. The others see a version of the file without the edits. Then, once Serena approves those edits, the edits are displayed on the computers of other users. This can be done by the use of track changes feature of a productivity application that has several viewing modes: View Original, which allows select users to see the original version without the edits in redline edits; View Markup, which allows select users to view the edited version with the redline edits; and No Markup, which allows select users to view the edited version without the changes in redline format. The viewing modes for can be selected for any particular users, and the selection can be made by any user providing an input, such as a UI input, an input gesture or voice command.

Figure 7B:
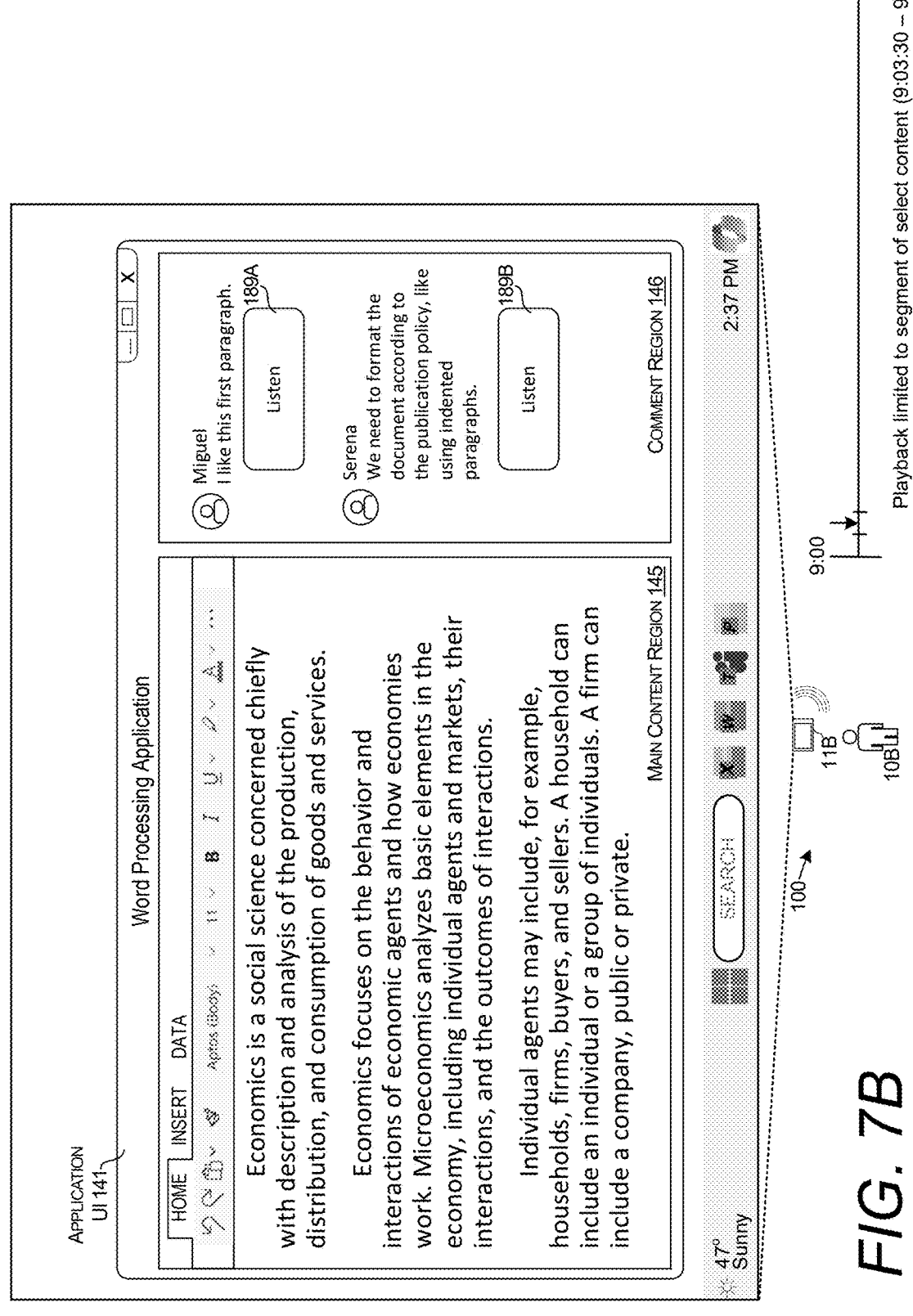
FIG. 7B illustrates a user interface displayed on a second computer in regular operating mode displaying a file, the second computer playing an audio segment of a meeting that includes the content.

FIGS. 7A-7B show an example of how the select content derived from the communication data captured during a meeting can be viewed within the file. In addition, this example shows how the link inserted in the file can be selected by a user to play a portion of the meeting that includes statements of the select content. FIG. 7A illustrates a user interface displayed on a second computer showing select content from meeting communication data that is inserted in a file and a link to an audio segment of the meeting that includes the select content. FIG. 7B illustrates a user interface displayed on the second computer in regular operating mode displaying a file, the second computer playing an audio segment of a meeting that includes the select content. For example, if the link 189A inserted into the file is configured to play the audio stream of the meeting starting at 9:03:30 AM and only play for the 8 seconds that includes that statement. A user selection of that link would only play 8 seconds of the meeting starting at the 9:03:30 AM time marker.

Figure 8A:
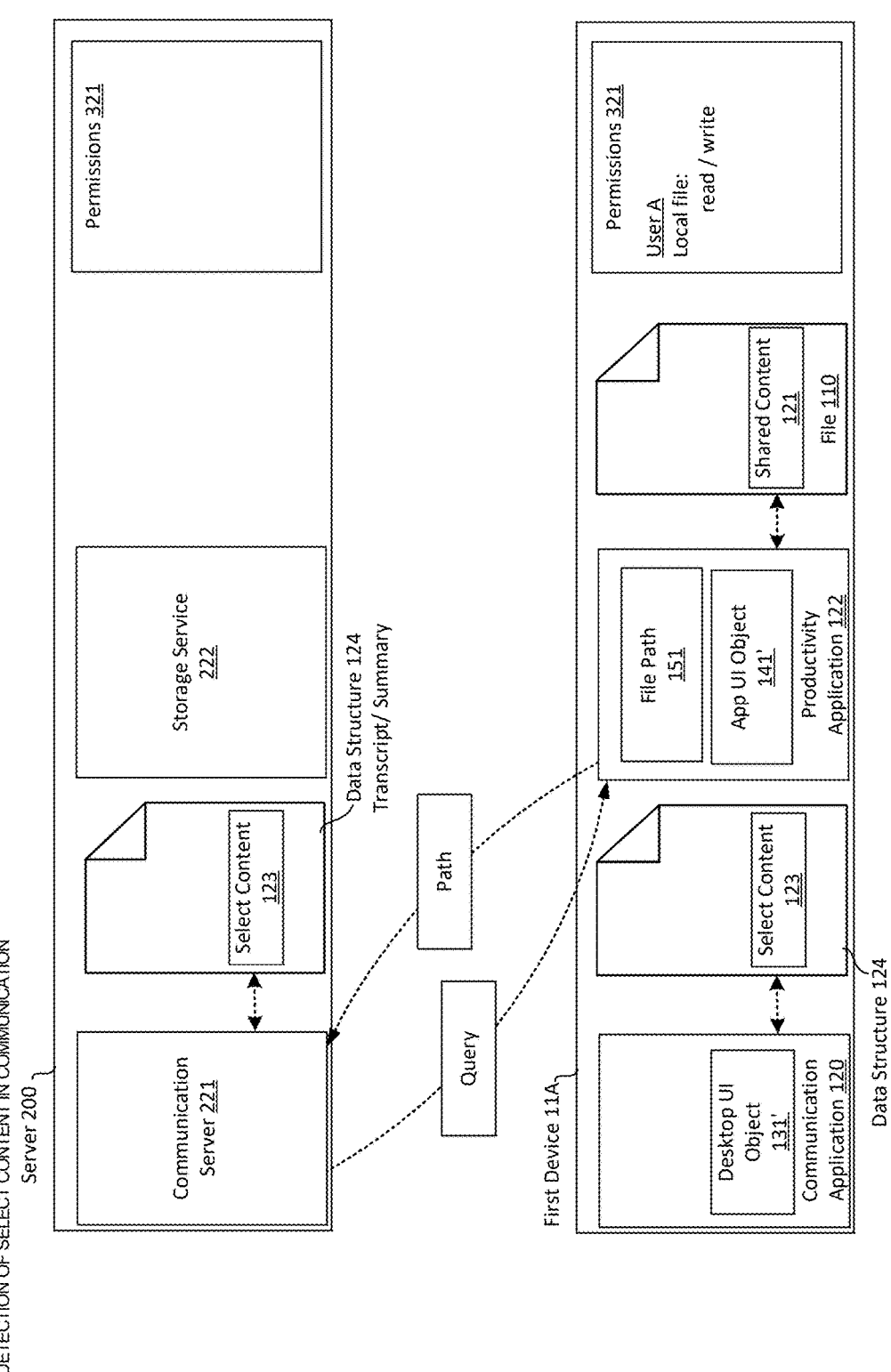
FIG. 8A illustrates a block diagram of a system for identifying the location of a file that is stored on a client device.
Figure 8B:
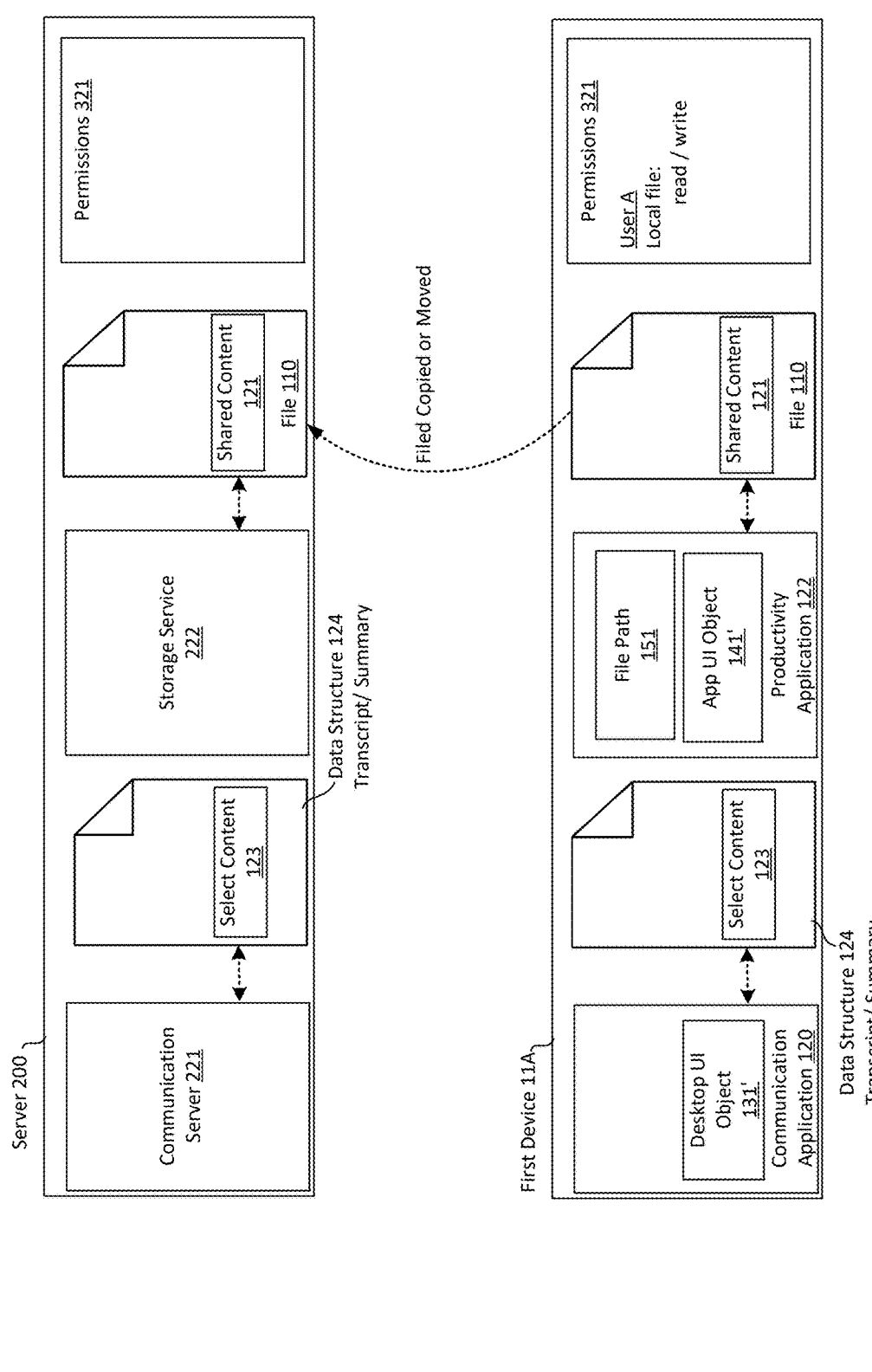
FIG. 8B illustrates a block diagram of a system for identifying a location of a file that is stored on a client device, the system performing operations for moving or copying the file to a server.

The system can identify the location of a file for the purpose of inserting select content from communication data of a meeting into the file. FIGS. 8A-8C show an example of a process where the system identifies the location of a file that is stored on a client device. The file 110 contains the share content 121, which are shown in the examples described above as the original content of the file 110. As shown in FIG. 8A, when a file is shared in screen sharing mode, the system identifies the location of that file by sending a query to the productivity application and a storage service 222 to retrieve a path indicating a storage location of the application file. In this example, the path shows that the application file 110 is stored on the client device 11A. In response to determining that the application file 110 is stored on the first computing device, as shown in FIGS. 8A and 8B, the system copies or moves the application file 110 from the first computing device to the storage service 222 of a server 200. As shown in FIG. 8C, the system inserts the select content 123 into the file 110. The select content 123 can also include a link to the meeting audio 129. Also shown in FIG. 8C, the system configures the permissions for the link to the audio 129 and permissions for the file 110 to permit attendees of the communication session to view and edit the application file and access to receive the audio 129 clip that includes the select content. These changes can also be applied to a copy of the file stored on the client device 11A.

Figure 9A:
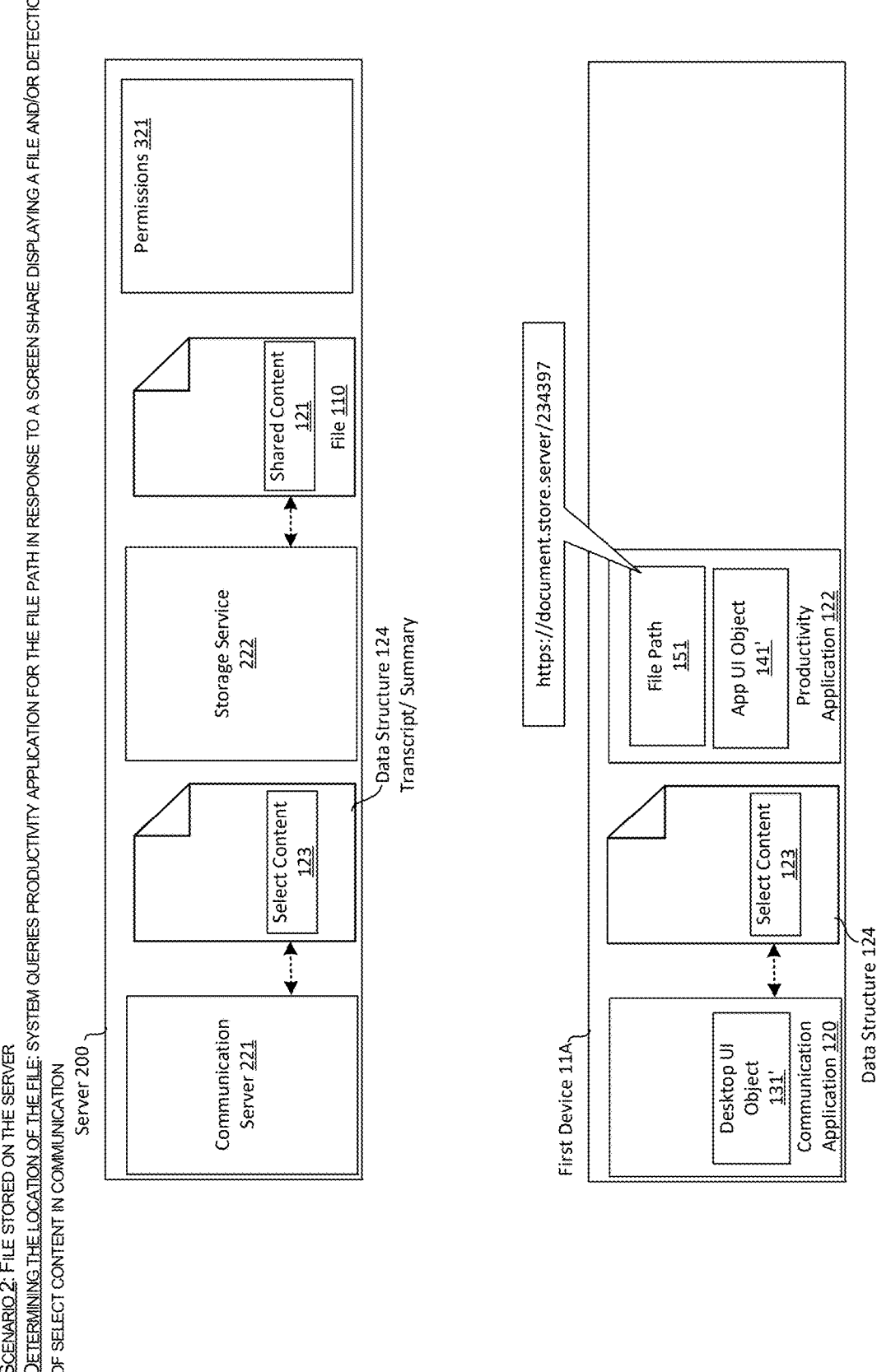
FIG. 9A illustrates a block diagram of a system for identifying the location of a file that is stored on a server.
Figure 9B:
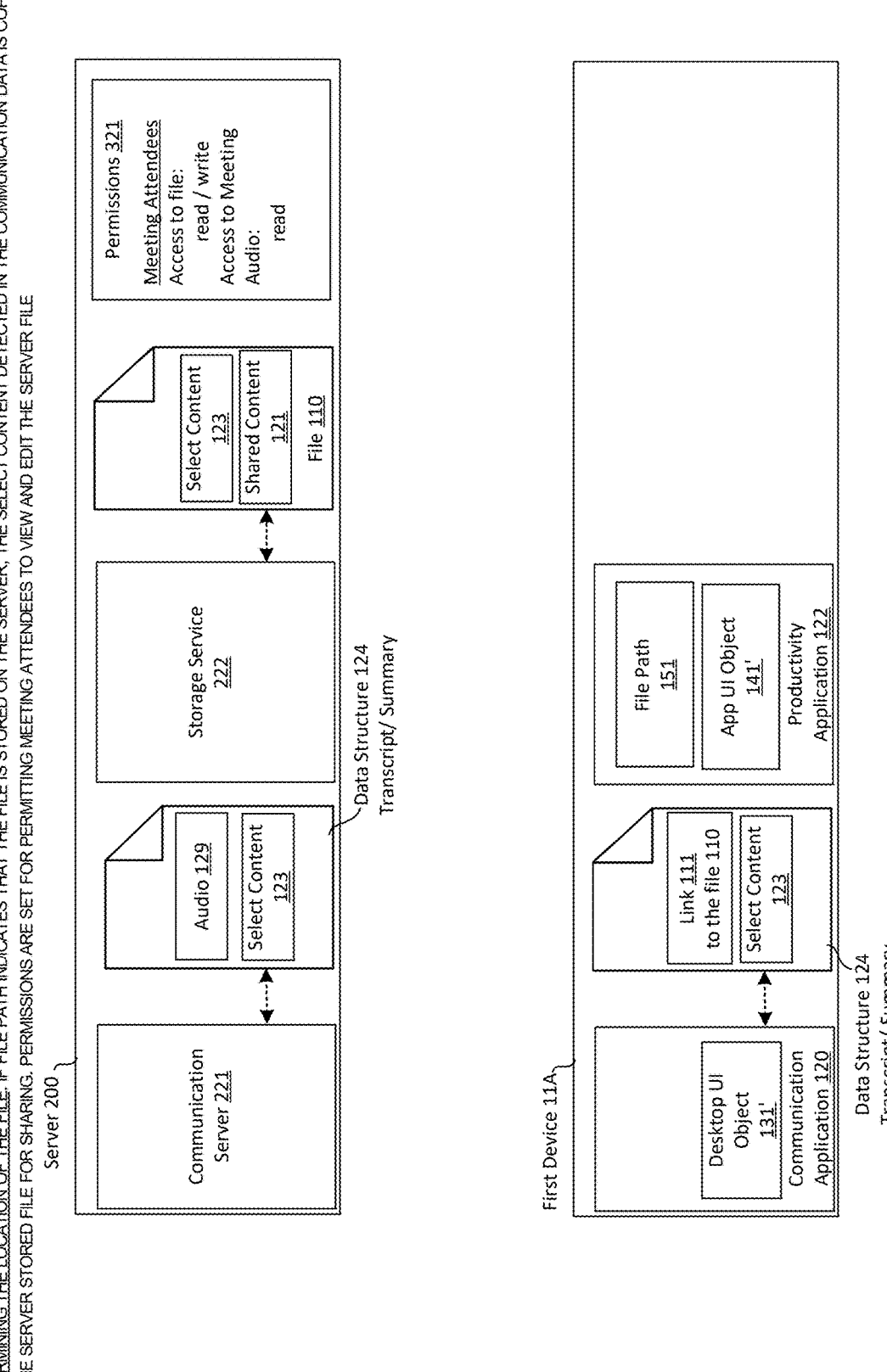
FIG. 9B illustrates a block diagram of a system for identifying a location of a file that is stored on a server, the system performing operations for inserting content from meeting communication data in the file that is stored on the server.

FIGS. 9A-9B show a process where the system identifies the location of a file that is stored on a server 200. As shown in FIG. 9A, when a file is shared in screen sharing mode, the system identifies the location of that file by sending a query to the productivity application and a storage service 222 to retrieve a path indicating a storage location of the application file. In this example, the path shows that the application file 110 is stored on a storage service 222 of the server 200. In response to determining that the application file 110 is stored on the storage service 222 of the server 200, as shown in FIGS. 9B, the system inserts the select content 123 into the file 110. The select content 123 can also include a link to the meeting audio 129. Also shown in FIG. 9B, the system configures the permissions for the link to the audio 129 and permissions for the file 110 to permit attendees of the communication session to view and edit the application file and access to receive the audio 129 clip that includes the select content. The file can also be copied to the first device having the same permissions.

Figure 10A:
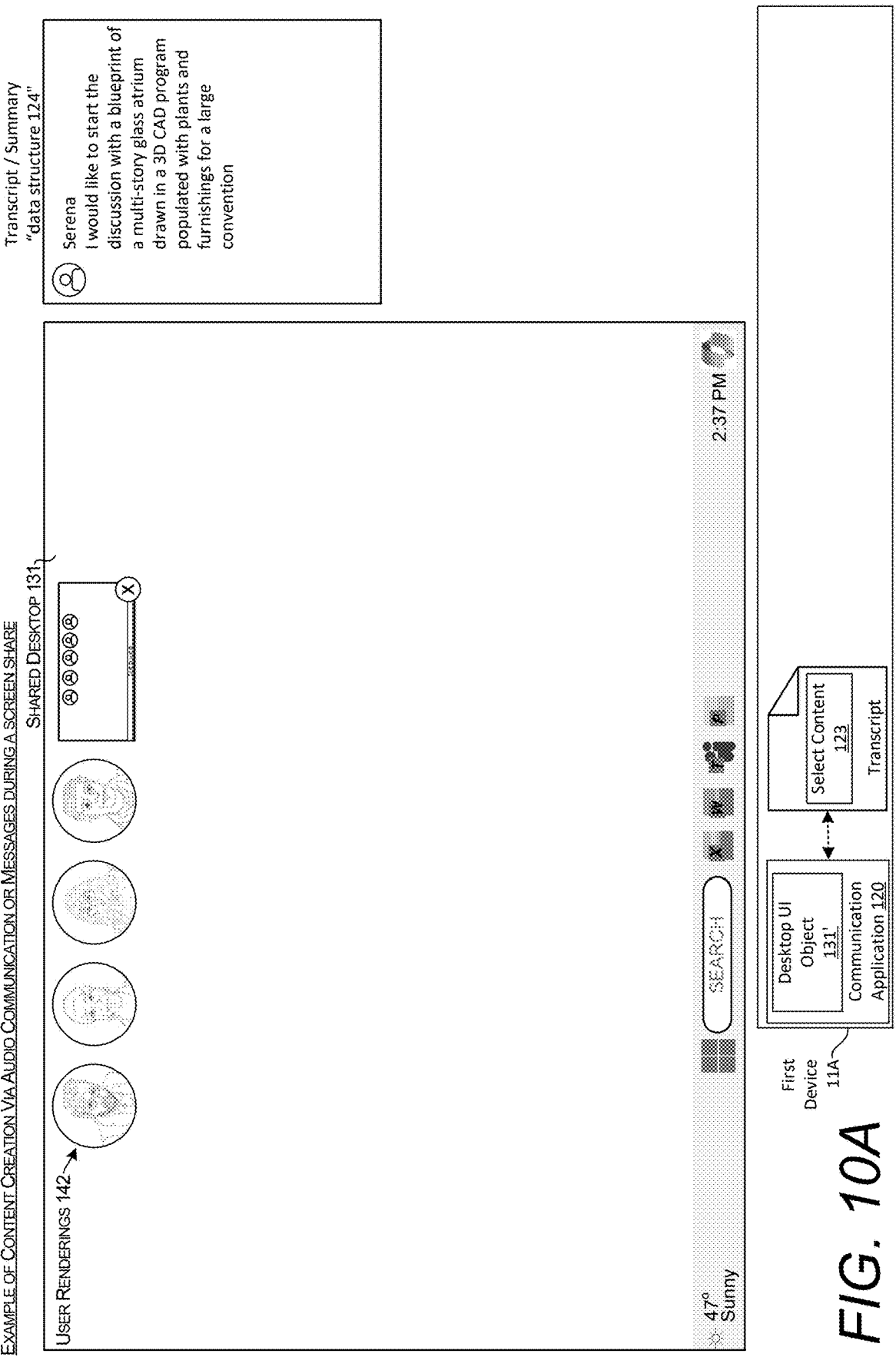
FIG. 10A shows an example of a user interface receiving instructions during a screen share session, the instructions causing the generation of new content data.
Figure 10B:
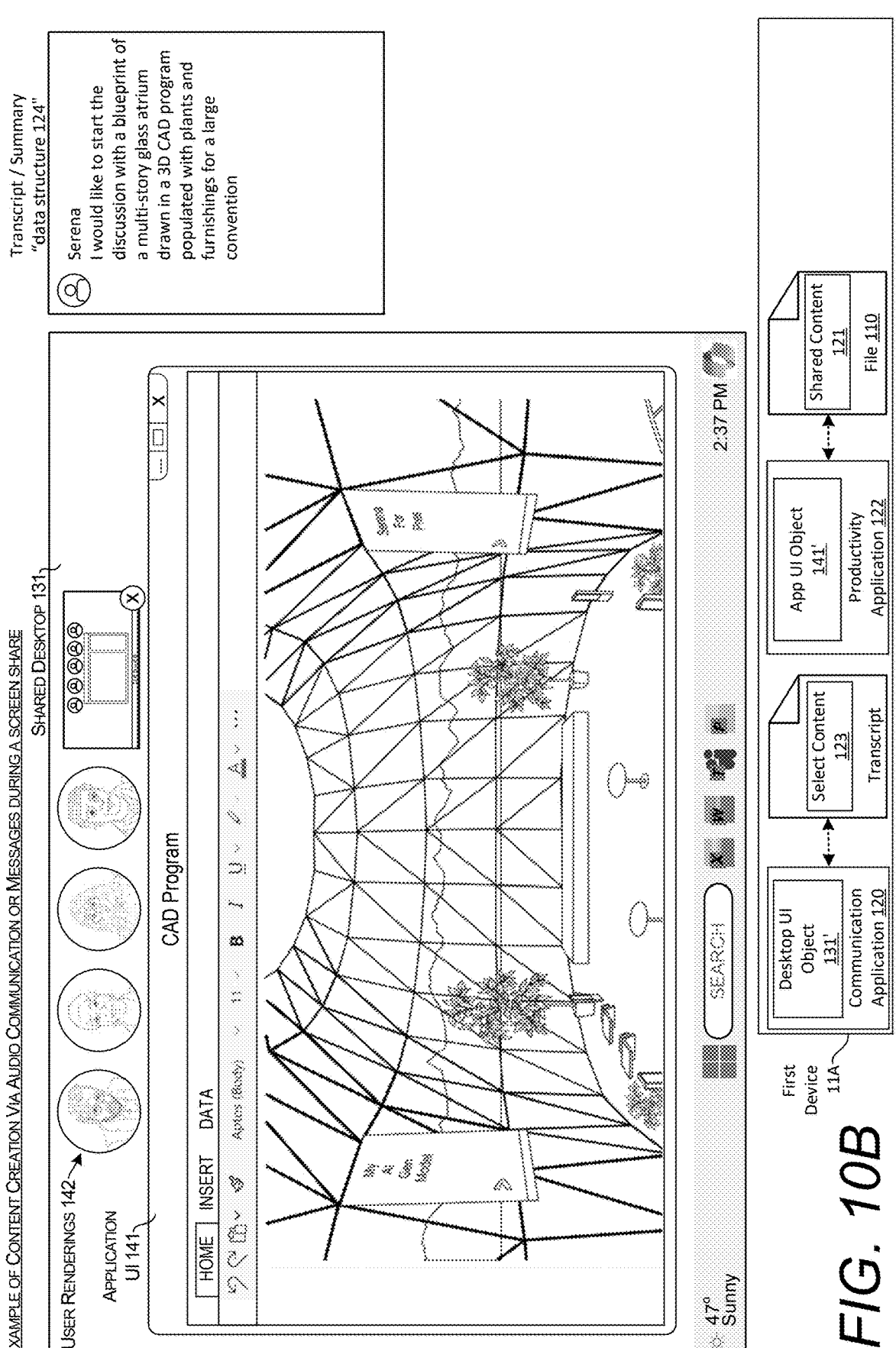
FIG. 10B shows an example where new content is generated in response to received instructions during a screen share session.

FIGS. 10A-10B show an example where communication data of a meeting can be interpreted to generate content for a document. In this example, as shown in FIG. 10A, if the system detects that an audio stream includes statements to generate new content, the system can interpret that statement and generate content according to those statements and automatically display that generated content into a file that is displayed in a desktop screenshare. In this example, while the first device is in screen sharing mode, the system interprets the statements made in a meeting audio stream. In this example, Serena provides specific statements that provide details of a particular architectural project. In this example, the statement also includes a preference for a particular application, such as a CAD application. In response to this statement, the system identifies the productivity application described in the statement and causes execution of that application. In addition, the portion of the statement that pertains to the content is sent to an AI model, such as a large language model. This input, in addition to other grounding data, causes the AI model to generate content for the selected productivity application. In this example, as shown in FIG. 10B, the system generates content data based on the voice input captured in the audio stream, and displays that content using the application 120 in the application UI 141. The application UI 141 is also displayed to the other meeting participants while the first device is in the screen sharing mode.

Figure 11:
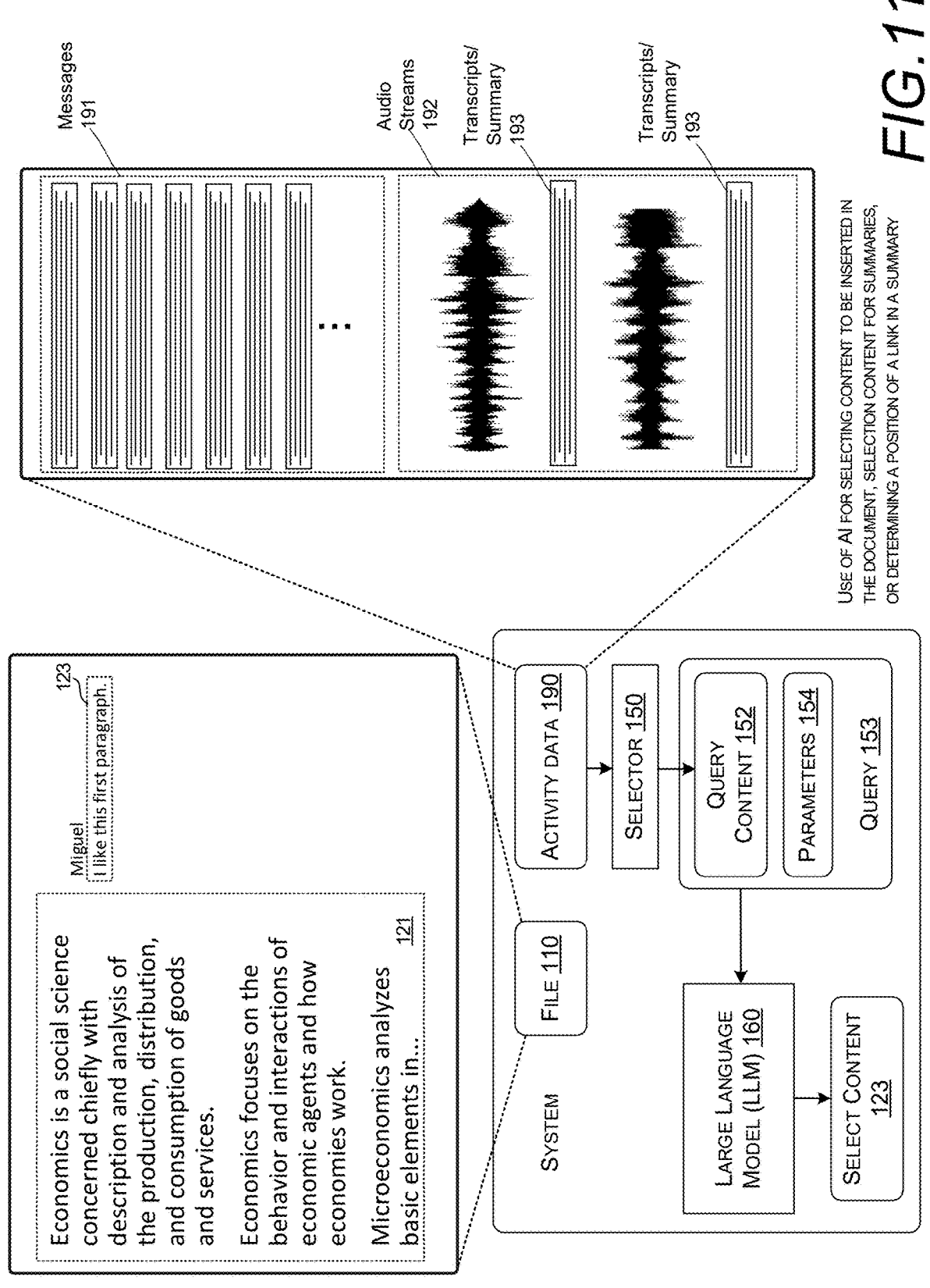
FIG. 11 shows an example of a system using an AI model to analyze communication data.

With reference to FIG. 11, embodiments disclosed herein use an AI model to identify select content from the communication data of a meeting. The AI model can also be used to generate new content from the communication data of a meeting and also generate instructions to modify existing file content. The system can utilize an AI model, such as a large language model ("LLM 160"), to identify select content from activity data 190, which can include messages 191 exchanged between participants of a meeting, transcripts or summaries 193 derived from audio streams 192 or other content that is shared during a screen sharing session of a meeting.

For example, the AI model can be used to analyze the activity data 190 to determine if any portion of the activity data has a threshold level of relevancy with the shared content 121 of the application file 110, a predetermined topic, and/or a predetermined person. A portion of the activity data can be a phrase, sentence, or word that is stored in an audio format, an image format, or in a text format. If it is determined that a portion of the activity data has a threshold level of relevancy with the file, a topic, or person, such portions are determined to be select content 123, as shown in FIG. 11, the select content 123 is included in the file 110 and/or included as select content for a summary or a transcript.

The system can generate a query 153 that includes query content 152 and query parameters 154. The query content can include content that is filtered from the activity data by a selector 150. For example, the selector can sort and filter the activity data to build a query in a particular format. A full transcript cannot be processed by a LLM, so sections of a transcript are selected for use for individual queries. This is done because LLMs have limits with respect to the quantity of information that could be inserted into a query. The selector may analyze messages from a particular user and arrange the query content to a particular format that is suitable for the large language model. For example, messages and a transcript may be parsed and reformatted to a string, "Serena said 'thank you for joining the meeting,' Miguel said 'I like this first paragraph.'" This query content can be arranged with parameters 154 that provide instructions to the model such as, "select statements provided by the users that relate to the file or mention the file during the time of the screen sharing session." The system can also include the file as part of the parameters, of which the LLM would use the file as grounding data. In response to such a query, the large language model can identify the select content 123, such as Miguel's statement 'I like this first paragraph.' As shown, such content can be inserted into the document and/or inserted into a summary.

In another example, messages and transcript data may be parsed and reformatted to a string for the query content, such as "Serena stated that the paragraphs should be indented." This query content can be arranged with parameters 154 that provide instructions to the model such as, generate executable code to modify the file according to the instructions provided by Serena." The file can be included as part of the query parameters, and the query can be sent to the LLM. In response to such a query, the large language model can generate select content in the form of executable instructions to modify the file, e.g., indent each paragraph of the file. In another example, the select content can also be used to generate new content and also generate instructions to identify an application to display that generated content. Such an example is shown in FIG. 10B, where a natural language description of an architectural file is sent to a large language model causing the generation of a new file.

Turning now to FIG. 12, aspects of a routine 800 for inserting links in a meeting transcript or a meeting summary having select content obtained from communication data of a meeting, where the links provide access to an application file communicated to meeting participants in a desktop sharing mode. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine are described herein as being implemented, at least in part, by an application, component and/or circuit, such as a device module that can be included in any one of the memory components disclosed herein, including but not limited to RAM. In some configurations, the device module can be a dynamically linked library (DLL), a statically linked library, functionality enabled by an application programing interface (API), a compiled program, an interpreted program, a script or any other executable set of instructions. Data, such as input data or a signal from a sensor, received by the device module can be stored in a data structure in one or more memory components. The data can be retrieved from the data structure by addressing links or references to the data structure.

Although the following illustration refers to the components depicted in the present application, it can be appreciated that the operations of the routine may be also implemented in many other ways. For example, the routine may be implemented, at least in part, by a processor or circuit of another remote computer (which can be a server) or a local processor or circuit of a local computer (which can be a client device receiving a message or a client device sending the message). Any aspect of the routine, which can include the generation of a prompt, communication of any of the messages with the prompt to an NLP algorithm, use of an NLP algorithm, or a display of a result generated by an NLP algorithm, can be performed on either a device sending a message, a device receiving a message, or on a server managing communication of the messages for a thread. In addition, one or more of the operations of the routine may alternatively or additionally be implemented, at least in part, by a chipset working alone or in conjunction with other software modules. Any service, circuit or application suitable for providing input data indicating the state of any device may be used in operations described herein.

The routine starts at operation 802 where the system invokes a communication session in a normal meeting mode. In normal meeting mode, client devices share audio streams, video streams and messages, which are both referred to herein as communication data. In normal meeting mode, also referred to herein as normal operating mode, none of the client devices are sharing a desktop screen with other clients devices.

At operation 804, at least one client device of the system invokes a screen sharing mode for an application file. For example, a client device, such as the first device 11A, invokes a screen sharing mode during a communication session. In operation 804, the first computing device 11A executes a productivity application displaying shared content 121 of a selected application file 110. The system causes a display of a rendering of a desktop environment 131 shared by the first computing device 11A on display screens of the plurality of computing devices 11A-11H of the communication session. The desktop environment 131 includes a rendering of the shared content 121 of the application file 110 on each of the display screens of the plurality of computing devices 11A-11H of the communication session.

At operation 806, while in screen sharing mode, the system analyzes audio streams and/or messages exchanged between the plurality of computing devices 11A-11H of the communication session. The system identifies select content to be added to a transcript or summary based on one or more factors. In one example, the system identifies select from communication data of a meeting. The communication data includes text derived from vocal discussions encoded in the audio streams or messages exchanged between the client devices of the communication session.

At operation 808, the system generates a meeting transcript or a meeting summary, either or both of which can be stored in a data structure 124. The data structure 124 includes the select content derived from the communication data. The data structure 124 also includes metadata that includes identities of users associated with the select content and other data associated with the select content, time stamps, etc.

In some embodiments, select portions of the meeting summary or the meeting transcript are inserted in the file, transcript and/or summary. If a statement provided in the communication data, such as a shared message or a statement made in an audio stream, is detected as being from a particular person, or pertaining to a particular topic, or pertaining to the shared application file, the system selects such statements or descriptions of those actions for inclusion in the file, transcript and/or summary. The system analyzes the audio streams and the messages communicated between the plurality of computing devices 11A-11F to identify select content having a threshold level of relevancy with the shared content 121 of the application file 110, a person, or a topic.

The system then adds the select content having the threshold level of relevancy with the shared content 121 of the application file 110 to the data structure and/or inserts that select content in the file 110. In one example, if a person in a meeting has a particular name or title, e.g., a CEO or Chief Editor, the system may be more biased to select content received from such participants. In another example, if a person says the want to edit or change content of the file, system may be more biased to select content from such statements.

At operation 810, the system determines the location of the application file 110, also referred to herein as the file 110. The file 110 can be located in a storage device of the client computer that is in screen sharing mode or the file can be located at a server. Operation 810 can include sending a query to the productivity application that is being used to edit and display the file 110, or sending a query to a storage service 222, to retrieve a path indicating a storage location of the application file. In response to determining that the application file is stored on the first computing device, the system copies or moves the application file from the first computing device to the storage service.

At operation 812, the system generates a link to provide access to the application file that is stored on the storage service. Also in operation 812, the system configures permissions for the link to permit attendees of the communication session to view and edit the application file using the link. The permissions can also be limited to read only permissions for the meeting participants.

At operation 814, the system inserts the link to the file in the transcript or summary, e.g., in the data structure 124. Operation 814 can include inserting the link 111 to the application file 110 in a data structure 124 storing the select content 123. The application file, when displayed in a productivity application, causes a display of the link concurrently with a display of the shared content that is stored within the file. An example of such operations is shown in FIG. 1E.

At operation 814, the system inserts the select content into the file. This can include the insertion of text from an audio stream of a user making a comment about the file, as the example shown in FIGS. 6D and 6E. The select content can be inserted into the file in the comment section or in a main content section. The select content can also cause one or more programs to edit the shared content of the file by interpreting the commands from an analysis of the speech captured in a meeting audio stream.

The routine can also include operations for display of the application file 110 via a link stored in the data structure. For example, as shown in FIGS. 2A-2B, the server causes a computer, such as the second computer, to access the file from a selection of the link in the transcript or summary. This can include causing a display of the data structure on a second computing device 11B, e.g., when a person is in a meeting program and looking at a meeting transcript that includes the display of the select content, e.g., comments made during a meeting, and the link to the application file. In response to an input at the client device, the client device causes a display of the application file using a productivity application.

As described above, as shown in FIGS. 3A-3D, a system can select specific parts of the audio communication or messages for generating a meeting summary. The summary can be from a real-time discussion based on audio signals and/or chat messages relating to the shared contents. The system can process the audio streams and the messages communicated between the plurality of computing devices 11A-11F to identify the select content 123 from the audio streams and the messages, comprises. The system also analyzing the audio streams and the messages communicated between the plurality of computing devices 11A-11F to identify select content having a threshold level of relevancy with the shared content 121 of the application file 110. The system then generates a meeting summary comprising the select content threshold level of relevancy with the shared content of the application file, the meeting summary stored in the data structure, wherein the link to the file is positioned within the meeting summary according to a location of the select content within the meeting summary.

In the operations described above, the system can also determine a location of the file for the purpose of generating a link to the file, or for inserting select content into the file. These operations can include sending a query to the productivity application and a storage service 222 to retrieve a path indicating a storage location of the application file. The server then determines that the application file is stored on a first computing device 11A of the plurality of computing devices 11A-11H. In response to determining that the application file is stored on the first computing device: the system then copies or moves the application file from the first computing device to the storage service, and configuring the link to provide access to the application file that is stored on the storage service. The system then configures permissions for the link to permit attendees of the communication session to view and edit the application file using the link.

The operations described herein can also, as shown in FIGS. 5A-5B, determine the location of the file, even if the file is stored on a server. This can include sending a query to the productivity application and a storage service 222 to retrieve a path indicating a storage location of the application file. The server can then determine that the application file is stored on a storage service 222 in communication with the first computing device 11A performing the screenshare, based on the path received from the storage service or by a productivity application displaying the file. In response to determining that the application file is stored on the storage service, the system configures the link to provide access to the application file that is stored on the storage service, and configures permissions for the link to permit attendees of the communication session to view and edit the application file using the link. The permissions for the link permit attendees of the communication session to view and edit the application file when using the link to access the application file.

The data structure described herein can include a meeting transcript, meeting summary, or a meeting recording. The data structure storing the select content includes at least one of a summary of the communication session, a transcript derived from audio streams received from the computing devices, or an audio file having a recording of the audio streams captured during the communication session. The link is embedded in the transcript or the summary at a position of the transcript relative a position of select content that is related to the application file, wherein the links can be inserted in an audio file using metadata that causes the link to be displayed when the audio file is played using a media player application.

In some embodiments, during the normal meeting mode, the computing devices are restricted from adding select content from the communication data to the application file and also restricted from adding links to the select content from the communication data to the application file.

In some embodiments, the normal meeting mode is only invoked when the computing devices are not in screen sharing mode with a displayed application file. The normal meeting mode can be invoked when the computing devices are in screen sharing mode without a displayed application file. The normal meeting mode can be invoked when the computing devices are displaying an application file but not in screen sharing mode.

When screen sharing mode is turned off, the system no longer analyzes the audio stream, the transcript or a summary for inclusion into the document. Also, when screen sharing mode is turned off, the system no longer includes links to the file in the summary or the transcript data structure.

In some embodiments, a content sharing mode can include a screen share, a desktop share or an application share. A screen share includes sharing a rendering of any content displayed on a user's display screen, where that rendering of any content is displayed to meeting participants. A desktop share includes a rendering of an operating system environment that is displayed to a user, where that operating system environment is displayed to meeting participants. An application share includes sharing a rendering of an application displaying a file, where that rendering is displayed to meeting participants. Screen sharing mode, Application Sharing mode, or Desktop sharing mode is specific to sharing pixel data of an application file being displayed on the presenter's system, as opposed to sharing the file itself. Where sharing the file itself with others is also referred to as content sharing, such as a co-editing event where all users access a OneDrive file. For illustrative purposes, content sharing mode can also include sharing a rendering of a file with other meeting participants and not sharing the entire file with meeting participants.

A content share can include operations where a computer determines that an event of screen sharing mode has occurred during the communication session. This event can include a voice input by a user, such as User A, displaying a file in an application and sharing an image of that displayed content to other users of a meeting. In response to determining that the event of screen sharing mode has occurred during the communication session, the rendering of the file is displayed with the other users of the meeting and the system identifies the location of the file, modifies the file according to the interpretation of the communication data, and causes a display of the application file having the inserted content that is derived from the audio streams and the messages of the communication session.

The present disclosure is supplemented by the following clauses:

FIGS. 1A-1F show an example where, during a screen sharing mode, a system inserts a link in a transcript or meeting summary to an application file.

Clause A: A method, executed by a data processing system (100), for inserting a reference in a meeting transcript or a meeting summary having content obtained from communication data of a meeting, the reference providing access to an application file communicated to meeting participants in a screen sharing mode, the method comprising: FIGS. 1A & 1B show a first mode of operation, audio and message communication without screen sharing. Then in FIG. 1C, the system transitions to a screen sharing mode activated for sharing a rendering of a file, during a communication session, invoking a screen sharing mode for a first computing device (11A) executing an application displaying shared content (121) of the application file (110), by causing a display of a rendering of the shared content (121) shared by the first computing device (11A) on display screens of the plurality of computing devices (11A-11H) of the communication session; FIGS. 1C-1E, in the screen sharing mode, the system creates meeting transcripts or summary for the real-time discussion based on audio signals and/or chat messages relating to the shared contents, in response to invoking the screen sharing mode: analyzing the audio stream or messages to identify "select content" to be added to the transcript or summary, processing audio streams and messages communicated between the plurality of computing devices (11A-11H) to extract content (123) of the communication session from the audio streams and the messages; determining that an event of screen sharing mode has occurred during the communication session; in response to determining that the event of screen sharing mode has occurred during the communication session: generating the transcript or summary, referred to as the data structure, generating a data structure (124) storing the extracted content (123), system determines a location of the application file, determining a location of the application file (110) for generating a reference (111) providing access to the application file (110), generating the reference (111) to the application file (110), and insert a link in the transcript/summary to the application file, inserting the reference (111) to the application file (110) in the data structure (124) storing the content (123); causing, based on the data structure (transcript/summary), a display of the extracted content transcript/summary content and the reference (the link) to the application file; receiving an input indicating a selection of the reference; and in response to the input, causing a display of the application file according to the reference.

Clause B: The method of the Clauses described herein, wherein processing the audio streams and the messages communicated between the plurality of computing devices (11A-11F) to extract the content (123) from the audio streams and the messages, comprises: analyzing the audio streams and the messages communicated between the plurality of computing devices (11A-11F) to identify content having a threshold level of relevancy with a predetermined topic; and generating a meeting summary comprising the content threshold level of relevancy with the predetermined topic, the meeting summary stored in the data structure, wherein the reference to the file is positioned within the meeting summary according to a location of the content within the meeting summary.

FIGS. 3A-3D: Meeting Summary: Selecting specific parts of the audio communication or messages for a meeting summary, e.g., a summary for the real-time discussion is based on audio signals and/or chat messages relating to the shared contents.

Clause C: The method of the Clauses described herein, wherein processing the audio streams and the messages communicated between the plurality of computing devices (11A-11F) to extract the content (123) from the audio streams and the messages, comprises: analyzing the audio streams and the messages communicated between the plurality of computing devices (11A-11F) to identify content having a threshold level of relevancy with the shared content (121) of the application file (110); and generating a meeting summary comprising the content threshold level of relevancy with the shared content of the application file, the meeting summary stored in the data structure, wherein the reference to the file is positioned within the meeting summary according to a location of the content within the meeting summary.

FIGS. 4A-4C, Determining a location of the file, Scenario A: File stored on the client.

Clause D: The method of the Clauses described herein, wherein determining the location of the application file comprises: sending a query to the application and a storage service (222) to retrieve a path indicating a storage location of the application file; determining that the application file is stored on a first computing device (11A) of the plurality of computing devices (11A-11H); in response to determining that the application file is stored on the first computing device: copying or moving the application file from the first computing device to the storage service, and configuring the reference to provide access to the application file that is stored on the storage service, and configuring permissions for the reference to permit attendees of the communication session to view and edit the application file using the reference.

FIGS. 5A-5B: determining the location of the file, Scenario B: File stored on the server.

Clause E: The method of the Clauses described herein, wherein determining the location of the application file comprises: sending a query to the application and a storage service (222) to retrieve a path indicating a storage location of the application file; determining that the application file is stored on a storage service (222) in communication with the first computing device (11A) performing the screenshare; and in response to determining that the application file is stored on the storage service: configuring the reference to provide access to the application file that is stored on the storage service, and configuring permissions for the reference to permit attendees of the communication session to view and edit the application file using the reference.

FIG. 11: Using an AI model to interpret the communication data to generate the summary or metadata of a transcript.

Clause D: The method of the Clauses described herein, further comprising generating a query that includes activity data comprising messages and transcripts derived from audio streams of the meeting and meeting roster data for a large language model, the query including instructions that cause the large language model to identify portions of the activity data related to at least one of the application file, a predetermined person, a predetermined topic, or instructions to modify the shared content of the application file; communicate the query to the large language model causing the large language model to generate the content based on the portions of the activity data related to at least one of the application file, the predetermined person, the predetermined topic, or the instructions to modify the shared content of the application file.

Clause E: The method of the Clauses described herein, further comprising configuring permissions for the reference to permit attendees of the communication session to view and edit the application file when using the reference to access the application file, wherein the data structure for storing the content includes at least one of a summary of the communication session, a transcript derived from audio streams received from the computing devices, or an audio file having a recording of the audio streams captured during the communication session, wherein the reference is embedded in the transcript or the summary at a position of the transcript relative a position of content that is related to the application file, wherein the reference can be inserted in an audio file using metadata that causes the reference to be displayed when the audio file is played using a media player application.

FIGS. 6A-6D show an example where, during a screenshare mode, server (a) creates meeting transcripts or summary (b) determines location of a shared file, and (c) inserts transcripts/summary in the file.

Clause F: A method, executed by a data processing system (100), for inserting content obtained from communication data of a meeting into an application file displayed in a screen sharing mode during a meeting, the method comprising: FIGS. 6A and 6B: first mode of operation, audio and message communication without screen sharing. In the first operating mode, the system does not capture communication data (voice and text) for insertion into a document, FIG. 6C: Screen sharing mode activated for sharing a file displayed in an application, during the communication session, invoking a screen sharing mode for a first computing device (11A) executing an application (122) displaying shared content (121) of the application file (110), by causing a display of a rendering of the shared content (121) shared by the first computing device (11A) on display screens of the plurality of computing devices (11A-11H) of the communication session; FIGS. 6C-6D: in the second mode, system creates meeting transcripts or summary for the real-time discussion based on audio signals and/or chat messages relating to the shared contents" where the system analyzing the audio stream or messages to identify "select content" to be added to the file, the method further comprising processing audio streams and messages communicated between the plurality of computing devices (11A-11H) to extract the content (123) of the communication session from the audio streams and the messages; system determines a location of the application file by determining that an event of content sharing mode has occurred during the communication session; in response to determining that the event of content sharing mode has occurred during the communication session: determining a location of the application file (110), accessing the application file via the determined location; insert the content of the transcript/summary in the file directly by modifying the application file by inserting the content (123) into the application file (110); and causing a display of the application file having the inserted content that is derived from the audio streams and the messages of the communication session.

FIG. 6E: Comments made in the audio stream or messages cause edits to the document, e.g., adds proposed changes to the application file based on the transcript/summary, Clause G: The method of the Clauses described herein, further comprising: processing the audio streams and the messages communicated between the plurality of computing devices (11A-11H) to identify editing instructions for the shared content; and causing the application to modify the shared content based on the editing instructions.

FIG. 6E is a more specific version of claim 2, adding the generation of a summary or transcript as an intermediate step for processing editing instructions, e.g., adds proposed changes to the application file based on the transcript/summary.

Clause H: The method of the Clauses described herein, further comprising: processing the audio streams and the messages communicated between the plurality of computing devices (11A-11H) to generate a summary or transcript of the communication session; processing the summary or transcript of the communication session to identify editing instructions for the shared content; and causing the application to modify the shared content based on the editing instructions.

FIGS. 8A-8C: Determining a location of the file. Scenario A: File stored on the client.

Clause I: The method of the Clauses described herein, wherein determining the location of the application file comprises: sending a query to the application and a storage service (222) to retrieve a path indicating a storage location of the application file; determining that the application file is stored on a first computing device (11A) of the plurality of computing devices (11A-11H); in response to determining that the application file is stored on the first computing device: copying or moving the application file from the first computing device to the storage service, and inserting the content to the application file that is stored on the storage service, and configuring permissions for the application file to permit attendees of the communication session to view and edit the shared content within the application file and the content within the application file.

FIGS. 9A-9B: Determining a location of the file, Scenario B: File stored on the server.

Clause J: The method of the Clauses described herein, wherein determining the location of the application file comprises: sending a query to the application and a storage service (222) to retrieve a path indicating a storage location of the application file; determining that the application file is stored on a storage service (222) in communication with the first computing device (11A) performing the screenshare; and in response to determining that the application file is stored on the storage service: inserting the content to the application file that is stored on the storage service, and configuring permissions for the application file that is stored on the storage service to permit attendees of the communication session to view and edit the shared content within the application file and the content within the application file.

FIG. 11 shows an example where the system uses an AI model to interpret the communication data.

Clause K: The method of the Clauses described herein, further comprising: generating a query that includes activity data comprising messages and transcripts derived from audio streams of the meeting and meeting roster data for a large language model, the query including instructions that cause the large language model to identify portions of the activity data related to at least one of the application file, a predetermined person, a predetermined topic, or instructions to modify the shared content of the application file; communicate the query to the large language model causing the large language model to generate the content based on the portions of the activity data related to at least one of the application file, the predetermined person, the predetermined topic, or the instructions to modify the shared content of the application file, wherein the content is inserted into the application file or executed to edit the shared content of the application file.

Clause L: The method of the Clauses described herein, further comprising: configuring permissions to permit attendees of the communication session to view and edit the application file, wherein the content includes at least one of a summary of the communication session, a transcript derived from audio streams received from the computing devices, or an audio file having a recording of the audio streams captured during the communication session, wherein a position of the content within the application file is in proximity to related portions of the shared content.

Figure 13:
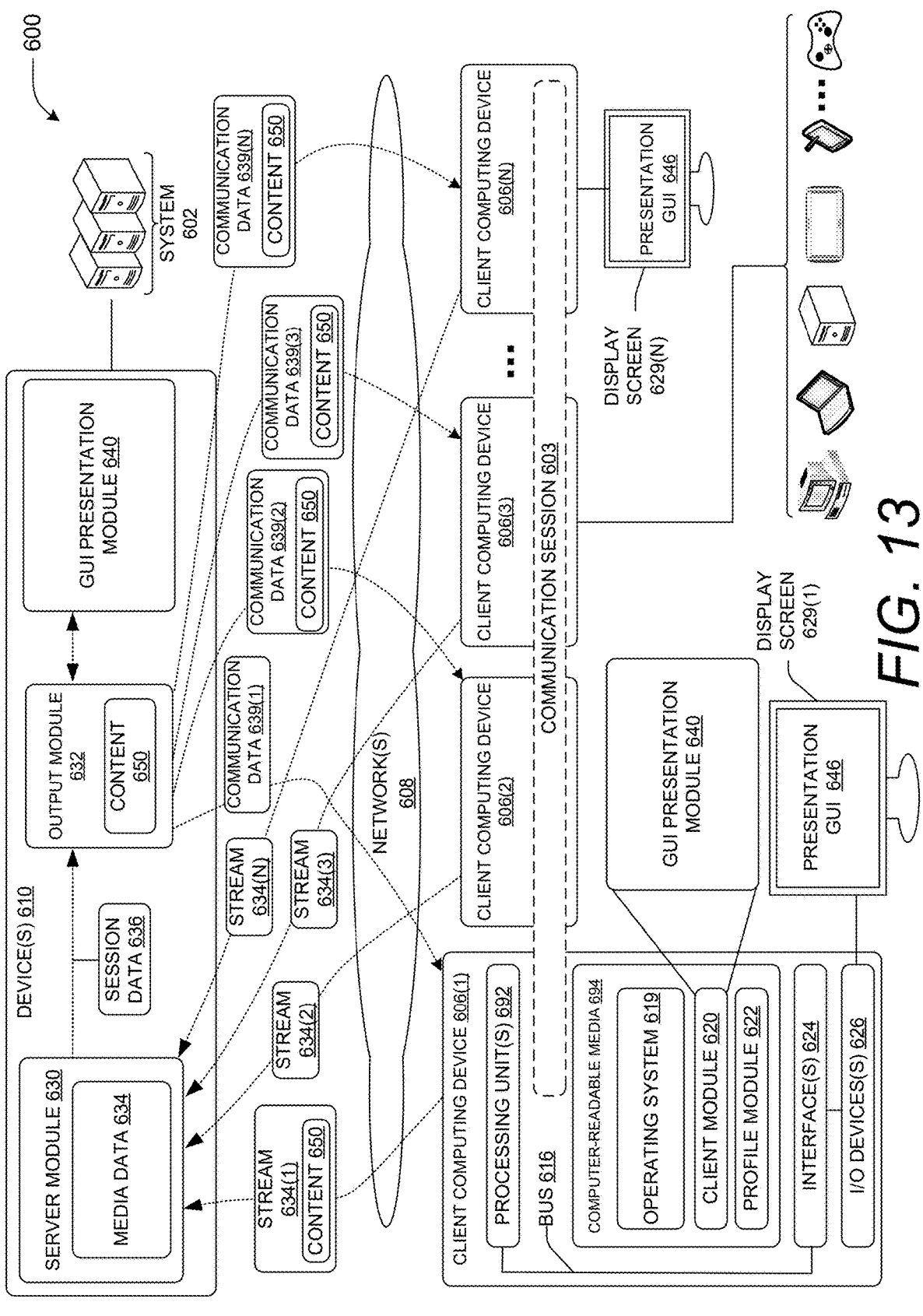
FIG. 13 is a diagram illustrating a distributed computing environment capable of implementing aspects of the techniques and technologies presented herein.

Turning now to FIG. 13, a diagram illustrating an example environment 600 in which a system 602 can implement the disclosed techniques is shown. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. For illustrative purposes, an "application file" can be a file for a word processing document, spreadsheet, a presentation file, email, data object, mark-up language, or any data structure in any format. In addition, a content sharing mode can be a mode of operation of a computer during communication session, e.g., a meeting, broadcast, etc., where a computer is causing a display of content on other computers participating in a communication session. This can include a desktop sharing session, where a user has an application displaying the contents of a file and a display of the content and the user's desktop is displayed on remote computers. This also includes other content sharing sessions that include web-based content sharing sessions, application-based content sharing sessions, or any other communication paradigm that allows one user to share content of a file or other data structure to remote computers participating in a communication session. In addition, a reference or link can include any data that is in a format, such that, when a user selects the reference or link, that selection causes a computer to retrieve data from an address defined in the reference or link.

In some implementations, a system 602 may function to collect, analyze, and share data that is displayed to users of a communication session 603. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds can be communicated with the messages.

The system 602 of FIG. 13 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media

694 such as via a bus 616, which in some instances can include one or more of a system bus, a data bus, an address bus, a PCI bus, a Mini-PCI bus, and any variety of local, peripheral, and/or independent buses. Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 13 illustrates that client computing device 606(1) is in some way connected to a display device (e.g., a display screen 629(N)), which can display a UI according to the techniques described herein.

In the example environment 600 of FIG. 13, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 13) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 13, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also include input data from each user, which can be used to control a direction and location of a representation. The content can also include instructions for sharing data and identifiers for recipients of the shared data. Thus, the content 650 is also referred to herein as input data 650 or an input 650.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 14:
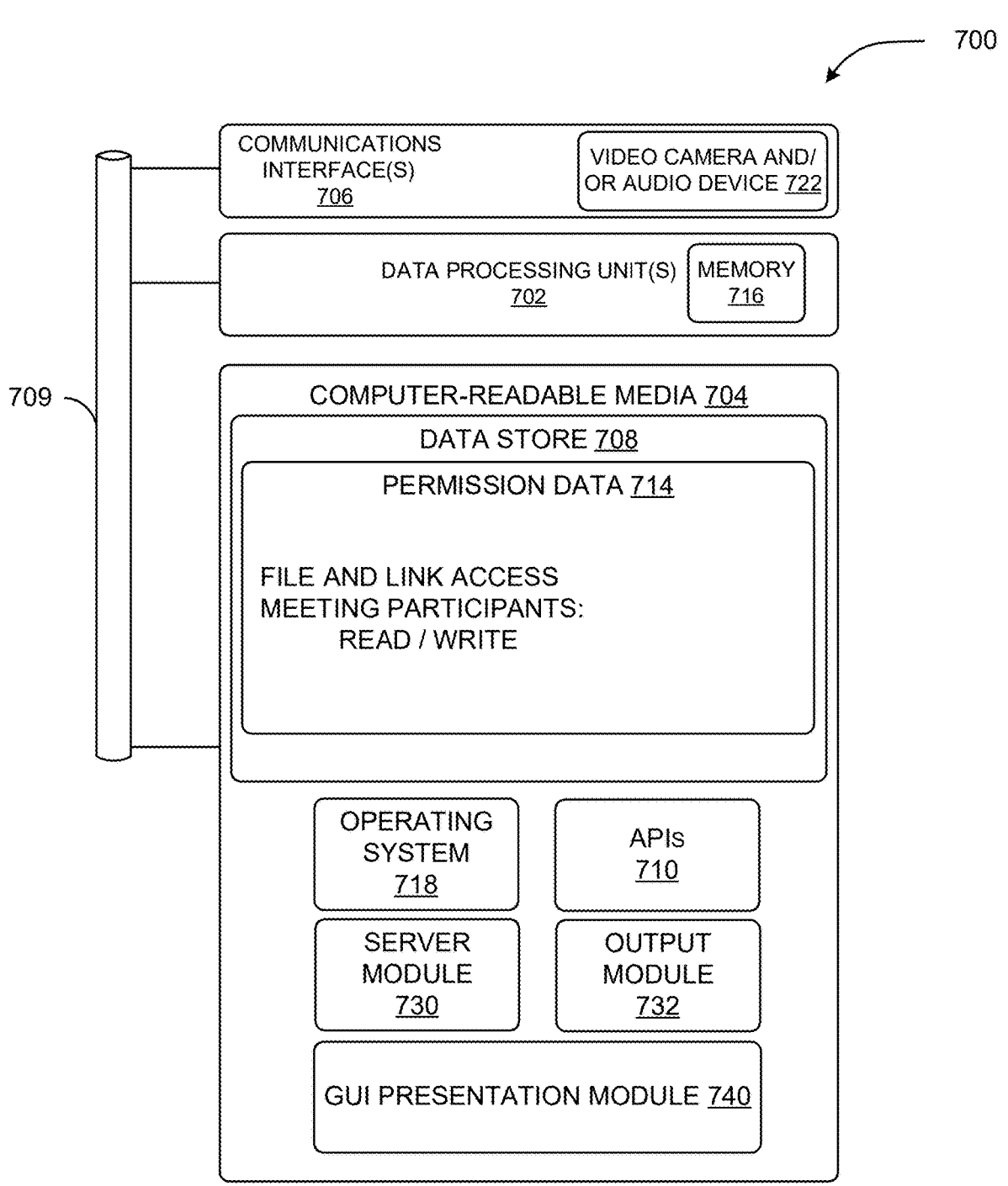
FIG. 14 is a computer architecture diagram illustrating a computing device architecture for a computing device capable of implementing aspects of the techniques and technologies presented herein.

FIG. 14 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("AS-SPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, computer-readable storage medium, computer-readable storage device, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store the primary calendar and secondary calendar, and other session data that show the status and activity level of each user. The session data can include a total number of participants (e.g., users and/or client computing devices) in a communication session, activity that occurs in the communication session, a list of invitees to the communication session, and/or other data related to when and how the communication session is conducted or hosted. The data store 708 may also include permission data 714. The permission data can indicate if meeting participants can access or edit a file linked in a transcript or a summary. In addition, the permissions can indicate if meeting participants can access, or write to, a file containing a transcript of a meeting or a summary of a meeting.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method, executed by a data processing system, for inserting a reference in a meeting transcript or a meeting summary having content obtained from communication data of a meeting, the reference providing access to an application file communicated to meeting participants in a screen sharing mode, the method comprising:

during a communication session, invoking a screen sharing mode for a first computing device executing an application displaying shared content of the application file, by causing a display of a rendering of the shared content shared by the first computing device on display screens of the plurality of computing devices of the communication session;

in response to invoking the screen sharing mode:

processing audio streams and messages communicated between the plurality of computing devices to extract content of the communication session from the audio streams and the messages:

generating a data structure storing the extracted content, determining a location of the application file for generating a reference providing access to the application file, generating the reference to the application file, and inserting the reference to the application file in the data structure storing the content;

causing, based on the data structure, a display of the extracted content and the reference to the application file; receiving an input indicating a selection of the reference; and in response to the input, causing a display of the application file according to the reference.

2. The method of claim 1, wherein processing the audio streams and the messages communicated between the plurality of computing devices to extract the content from the audio streams and the messages, comprises:

analyzing the audio streams and the messages communicated between the plurality of computing devices to identify content having a threshold level of relevancy with a predetermined topic; and generating a meeting summary comprising the content threshold level of relevancy with the predetermined topic, the meeting summary stored in the data structure, wherein the reference to the file is positioned within the meeting summary according to a location of the content within the meeting summary.

3. The method of claim 1, wherein processing the audio streams and the messages communicated between the plurality of computing devices to extract the content from the audio streams and the messages, comprises:

analyzing the audio streams and the messages communicated between the plurality of computing devices to identify content having a threshold level of relevancy with the shared content of the application file; and generating a meeting summary comprising the content threshold level of relevancy with the shared content of the application file, the meeting summary stored in the data structure, wherein the reference to the file is positioned within the meeting summary according to a location of the content within the meeting summary.

4. The method of claim 1, wherein determining the location of the application file comprises:

sending a query to the application and a storage service to retrieve a path indicating a storage location of the application file;

determining that the application file is stored on a first computing device of the plurality of computing devices;

in response to determining that the application file is stored on the first computing device:

copying or moving the application file from the first computing device to the storage service, and configuring the reference to provide access to the application file that is stored on the storage service, and configuring permissions for the reference to permit attendees of the communication session to view and edit the application file using the reference.

5. The method of claim 1, wherein determining the location of the application file comprises:

sending a query to the application and a storage service to retrieve a path indicating a storage location of the application file;

determining that the application file is stored on a storage service in communication with the first computing device performing the screenshare; and in response to determining that the application file is stored on the storage service:

configuring the reference to provide access to the application file that is stored on the storage service, and configuring permissions for the reference to permit attendees of the communication session to view and edit the application file using the reference.

6. The method of claim 1, further comprising:

generating a query that includes activity data comprising messages and transcripts derived from audio streams of the meeting and meeting roster data for a large language model, the query including instructions that cause the large language model to identify portions of the activity data related to at least one of the application file, a predetermined person, a predetermined topic, or instructions to modify the shared content of the application file;

communicate the query to the large language model causing the large language model to generate the content based on the portions of the activity data related to at least one of the application file, the predetermined person, the predetermined topic, or the instructions to modify the shared content of the application file.

7. The method of claim 1, configuring permissions for the reference to permit attendees of the communication session to view and edit the application file when using the reference to access the application file, wherein the data structure for storing the content includes at least one of a summary of the communication session, a transcript derived from audio streams received from the computing devices, or an audio file having a recording of the audio streams captured during the communication session, wherein the reference is embedded in the transcript or the summary at a position of the transcript relative a position of content that is related to the application file, wherein the reference can be inserted in an audio file using metadata that causes the reference to be displayed when the audio file is played using a media player application.

8. A system for inserting a reference in a meeting transcript or a meeting summary having content obtained from communication data of a meeting, the reference providing access to an application file communicated to meeting participants in a content sharing mode, the system comprising:

one or more processing units; and a computer-readable storage medium having encoded thereon computer-executable instructions to cause the one or more processing units to:

during a communication session, invoke a screen sharing mode for a first computing device executing an application displaying shared content of the application file, where the system causes a display of a rendering of the shared content shared by the first computing device on display screens of the plurality of computing devices of the communication session;

while in the screen sharing mode:

process the audio streams and the messages communicated between the plurality of computing devices to identify the content from the audio streams and the messages, generate a data structure storing the content, determine a location of the application file for generating the reference providing access to the application file, generate the reference to the application file, and insert the reference to the application file in the data structure storing the content, wherein the application file causes a display of the reference concurrently with a display of the shared content.

9. The system of claim 8, wherein the instructions further cause the one or more processing units to:

cause a display of the data structure on a second computing device, wherein the display of the computing device includes a display of the content and the reference to the application file;

receive an input indicating a selection of the reference having a section identifier for a section of the application file;

in response to the input indicating the selection of the reference having the section identifier for the section of the application file:

identify the section of the application that pertains to the section identifier, and cause a display of the section of the application file that pertains to the section identifier.

10. The system of claim 8, wherein processing the audio streams and the messages communicated between the plurality of computing devices to identify the content from the audio streams and the messages, comprises:

analyzing the audio streams and the messages communicated between the plurality of computing devices to identify content having a threshold level of relevancy with the shared content of the application file; and generating a meeting summary comprising the content threshold level of relevancy with the shared content of the application file, the meeting summary stored in the data structure, wherein the reference to the file is positioned within the meeting summary according to a location of the content within the meeting summary.

11. The system of claim 8, wherein determining the location of the application file comprises:

sending a query to the application and a storage service to retrieve a path indicating a storage location of the application file;

determining that the application file is stored on a first computing device of the plurality of computing devices;

in response to determining that the application file is stored on the first computing device:

copying or moving the application file from the first computing device to the storage service, and configuring the reference to provide access to the application file that is stored on the storage service, and configuring permissions for the reference to permit attendees of the communication session to view and edit the application file using the reference.

12. The system of claim 8, wherein determining the location of the application file comprises:

sending a query to the application and a storage service to retrieve a path indicating a storage location of the application file;

determining that the application file is stored on a storage service in communication with the first computing device performing the screenshare; and in response to determining that the application file is stored on the storage service:

configuring the reference to provide access to the application file that is stored on the storage service, and configuring permissions for the reference to permit attendees of the communication session to view and edit the application file using the reference.

13. The system of claim 8, wherein the instructions further cause the one or more processing units to: configure permissions for the reference to permit attendees of the communication session to view and edit the application file when using the reference to access the application file.

14. The system of claim 8, wherein the data structure for storing the content includes at least one of a summary of the communication session, a transcript derived from audio streams received from the computing devices, or an audio file having a recording of the audio streams captured during the communication session, wherein the reference is embedded in the transcript or the summary at a position of the transcript relative a position of content that is related to the application file, wherein the reference can be inserted in an audio file using metadata that causes the reference to be displayed when the audio file is played using a media player application.

15. A computer-readable storage medium having encoded thereon computer-executable instructions that cause a data processing system to insert a reference in a meeting transcript or a meeting summary having content obtained from communication data of a meeting, the reference providing access to an application file communicated to meeting participants in a screen sharing mode, the computer-executable instructions causing the one or more processing units of the data processing system to:

during a communication session, invoke a screen sharing mode for a first computing device executing an application displaying shared content of the application file, where the system causes a display of a rendering of the shared content shared by the first computing device on display screens of the plurality of computing devices of the communication session;

while in the screen sharing mode:

process the audio streams and the messages communicated between the plurality of computing devices to identify the content from the audio streams and the messages, generate a data structure storing the content, determine a location of the application file for generating the reference providing access to the application file, generate the reference to the application file, and insert the reference to the application file in the data structure storing the content, wherein the application file causes a display of the reference concurrently with a display of the shared content.

16. The computer-readable storage medium of claim 15, wherein the instructions further cause the one or more processing units to:

cause a display of the data structure on a second computing device, wherein the display of the computing device includes a display of the content and the reference to the application file;

receive an input indicating a selection of the reference;

in response to the input computing device, cause a display of the application file within the application on the second computing device.

17. The computer-readable storage medium of claim 15, wherein processing the audio streams and the messages communicated between the plurality of computing devices to identify the content from the audio streams and the messages, comprises:

analyzing the audio streams and the messages communicated between the plurality of computing devices to identify content having a threshold level of relevancy with the shared content of the application file; and generating a meeting summary comprising the content threshold level of relevancy with the shared content of the application file, the meeting summary stored in the data structure, wherein the reference to the file is positioned within the meeting summary according to a location of the content within the meeting summary.

18. The computer-readable storage medium of claim 15, wherein determining the location of the application file comprises:

sending a query to the application and a storage service to retrieve a path indicating a storage location of the application file;

determining that the application file is stored on a first computing device of the plurality of computing devices;

in response to determining that the application file is stored on the first computing device:

copying or moving the application file from the first computing device to the storage service, and configuring the reference to provide access to the application file that is stored on the storage service, and configuring permissions for the reference to permit attendees of the communication session to view and edit the application file using the reference.

19. The computer-readable storage medium of claim 15, wherein determining the location of the application file comprises:

sending a query to the application and a storage service to retrieve a path indicating a storage location of the application file;

determining that the application file is stored on a storage service in communication with the first computing device performing the screenshare; and in response to determining that the application file is stored on the storage service:

configuring the reference to provide access to the application file that is stored on the storage service, and configuring permissions for the reference to permit attendees of the communication session to view and edit the application file using the reference.

20. The computer-readable storage medium of claim 15, wherein the instructions further cause the one or more processing units to: configuring permissions for the reference to permit attendees of the communication session to view and edit the application file when using the reference to access the application file.

\* \* \* \* \*